US010957343B1

(12) United States Patent
Tomoda

(10) Patent No.: US 10,957,343 B1
(45) Date of Patent: Mar. 23, 2021

(54) DISK DEVICE HAVING CONVENTIONAL MAGNETIC RECORDING REGION AND SHINGLED MAGNETIC RECORDING REGION OF DIFFERENT LINEAR DENSITY

(71) Applicants: Kabushiki Kaisha Toshiba, Tokyo (JP); Toshiba Electronic Devices & Storage Corporation, Tokyo (JP)

(72) Inventor: Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/784,065

(22) Filed: Feb. 6, 2020

(30) Foreign Application Priority Data

Aug. 27, 2019 (JP) .............................. JP2019-154813

(51) Int. Cl.
*G11B 5/09* (2006.01)
*G11B 5/012* (2006.01)
*G11B 5/596* (2006.01)
*G11B 5/54* (2006.01)
*G11B 5/00* (2006.01)

(52) U.S. Cl.
CPC ................ *G11B 5/012* (2013.01); *G11B 5/09* (2013.01); *G11B 5/59605* (2013.01); *G11B 5/00* (2013.01); *G11B 5/54* (2013.01); *G11B 5/59638* (2013.01)

(58) Field of Classification Search
None
See application file for complete search history.

(56) References Cited

U.S. PATENT DOCUMENTS

| | | | |
|---|---|---|---|
| 8,699,159 B1* | 4/2014 | Malina | G11B 20/10305 360/31 |
| 8,922,936 B2 | 12/2014 | Okamoto et al. | |
| 9,111,578 B1 | 8/2015 | Hassel et al. | |
| 10,037,769 B1* | 7/2018 | Tomoda | G11B 5/315 |
| 10,068,597 B1* | 9/2018 | Jury | G11B 5/3948 |
| 10,090,016 B2 | 10/2018 | Gao et al. | |
| 10,381,040 B1* | 8/2019 | Boyle | G06F 3/0676 |
| 2014/0043708 A1* | 2/2014 | Erden | G11B 20/1217 360/39 |
| 2015/0029612 A1* | 1/2015 | Haines | G11B 5/012 360/75 |
| 2016/0148642 A1* | 5/2016 | Gao | G11B 20/1217 360/48 |
| 2018/0330748 A1* | 11/2018 | Liu | G11B 5/3143 |
| 2020/0043521 A1* | 2/2020 | Kashiwagi | G11B 5/82 |
| 2020/0201549 A1* | 6/2020 | Malina | G06F 3/0638 |

OTHER PUBLICATIONS

Flex Dynamic Recording, Timothy Feldman, vol. 43, No., Spring 2018. (Year: 2018).*

* cited by examiner

*Primary Examiner* — Tan X Dinh
(74) *Attorney, Agent, or Firm* — White & Case LLP

(57) ABSTRACT

According to one embodiment, a magnetic disk device includes a disk, a head which writes data to the disk and reads data from the disk, and a controller which executes, in a first region segmented in a radial direction of the disk, at least one of conventional recording processing which writes a plurality of tracks with a space in between in the radial direction at a first linear recording density and shingled recording processing which writes a plurality of tracks on top of one another in the radial direction at a second linear recording density which is less than or equal to the first linear recording density.

17 Claims, 13 Drawing Sheets

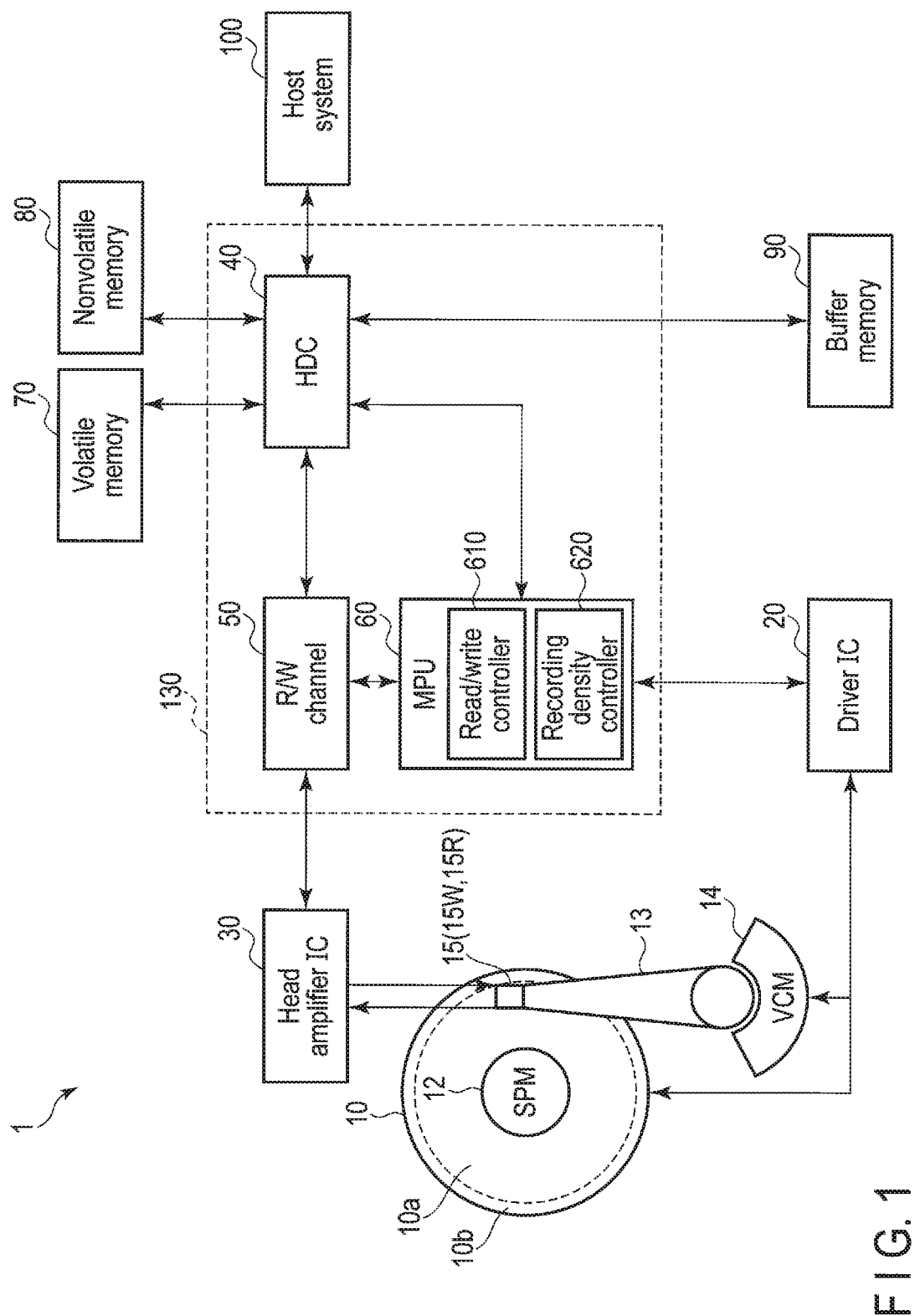
F I G. 1

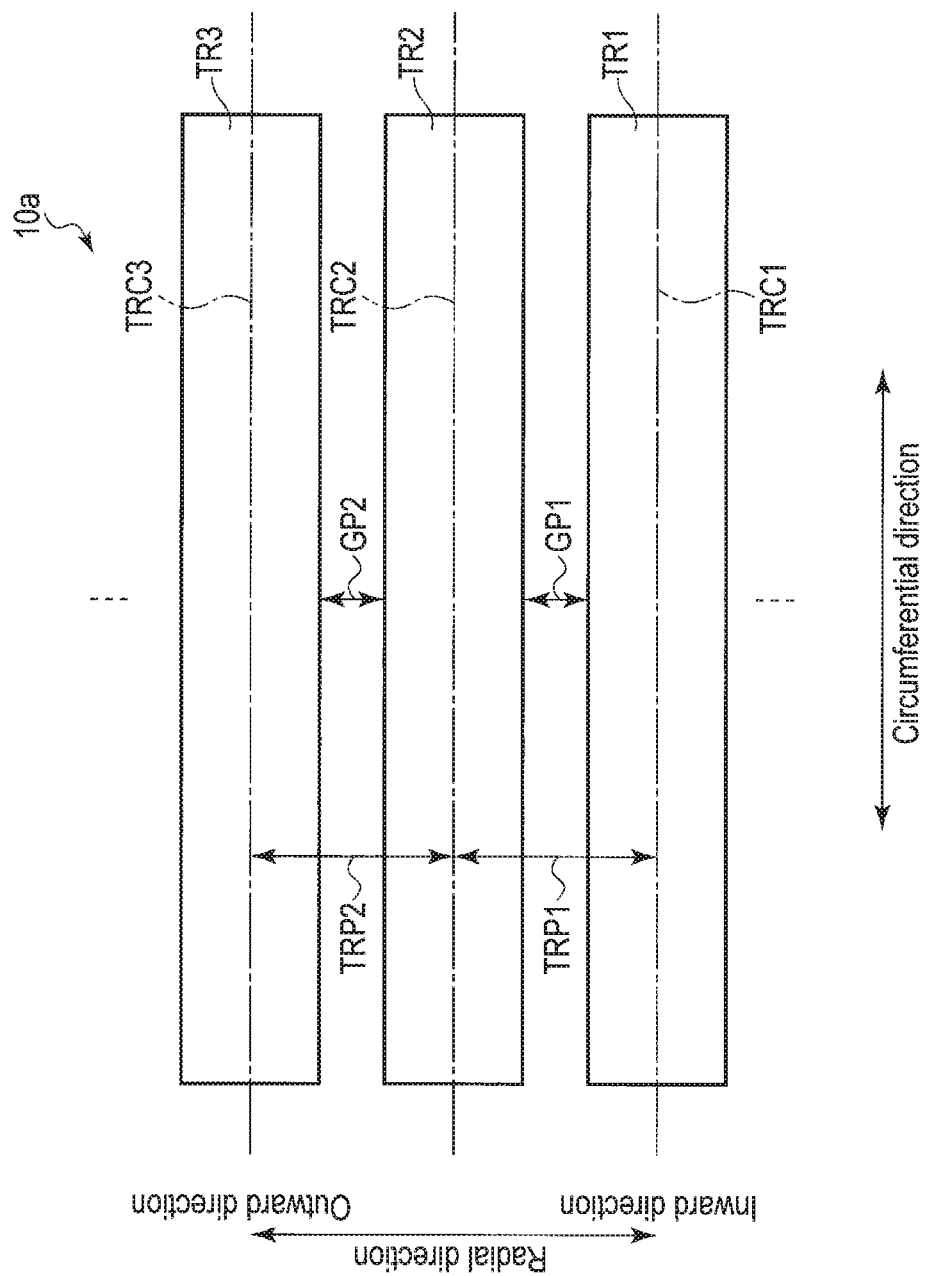
F I G. 3

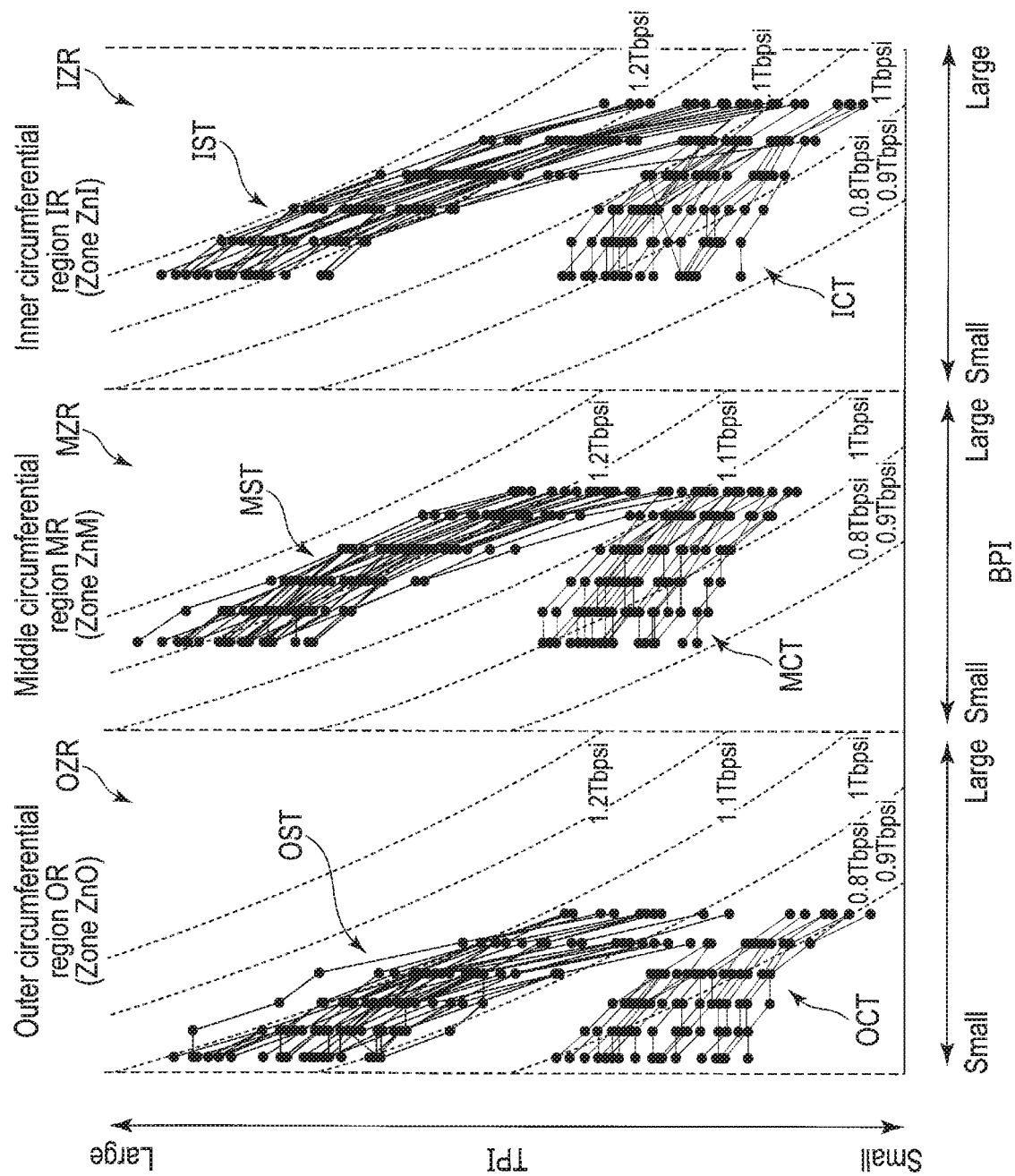
F I G. 5

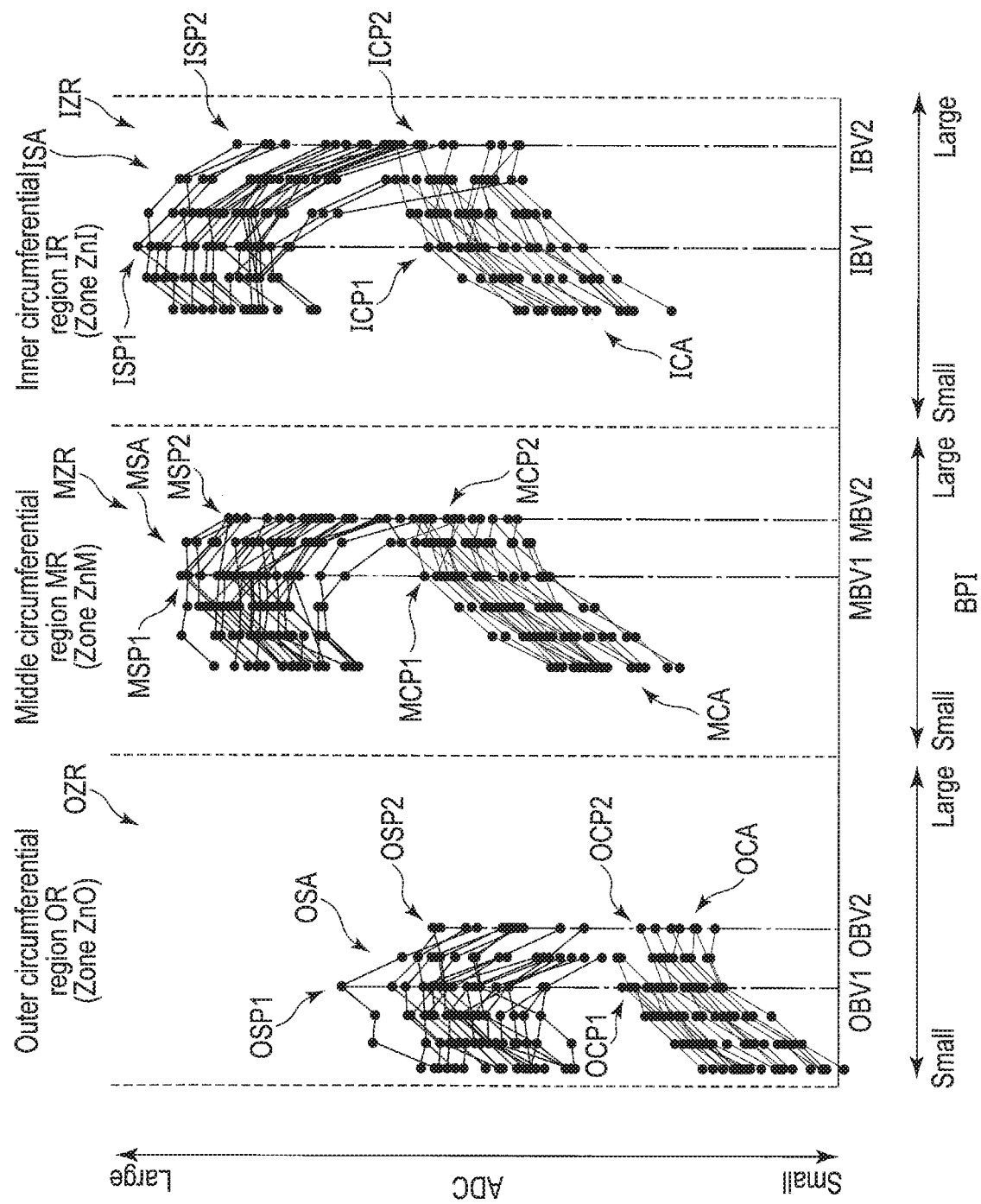
F I G. 6

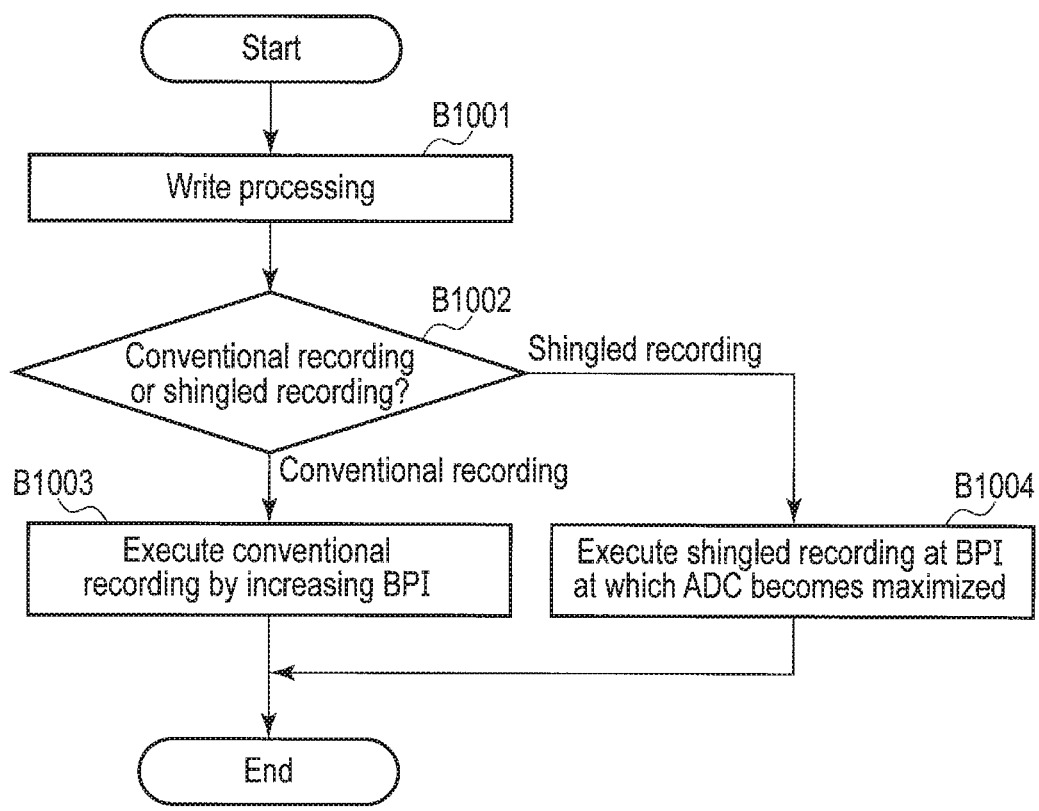
F I G. 10

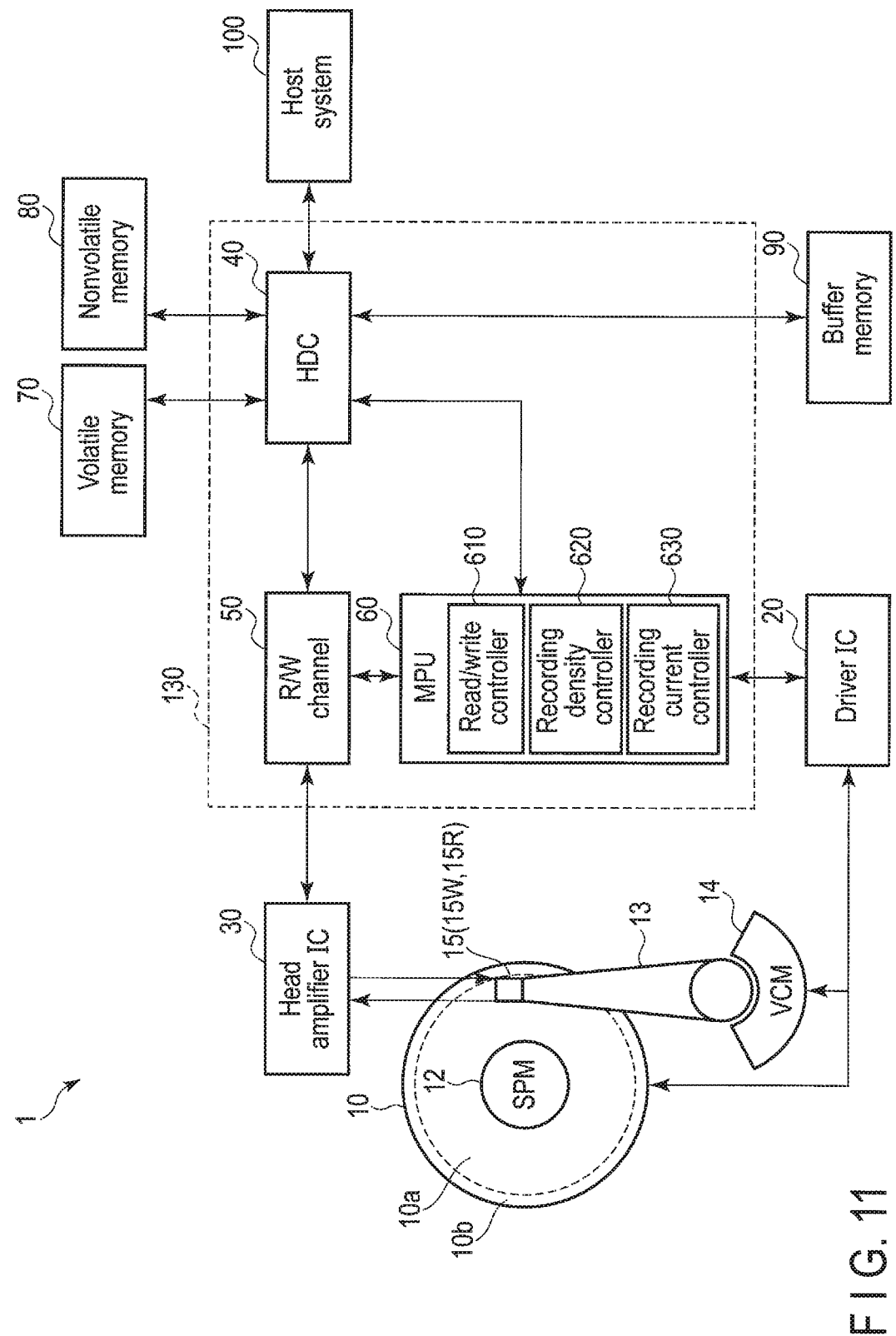
F I G. 11

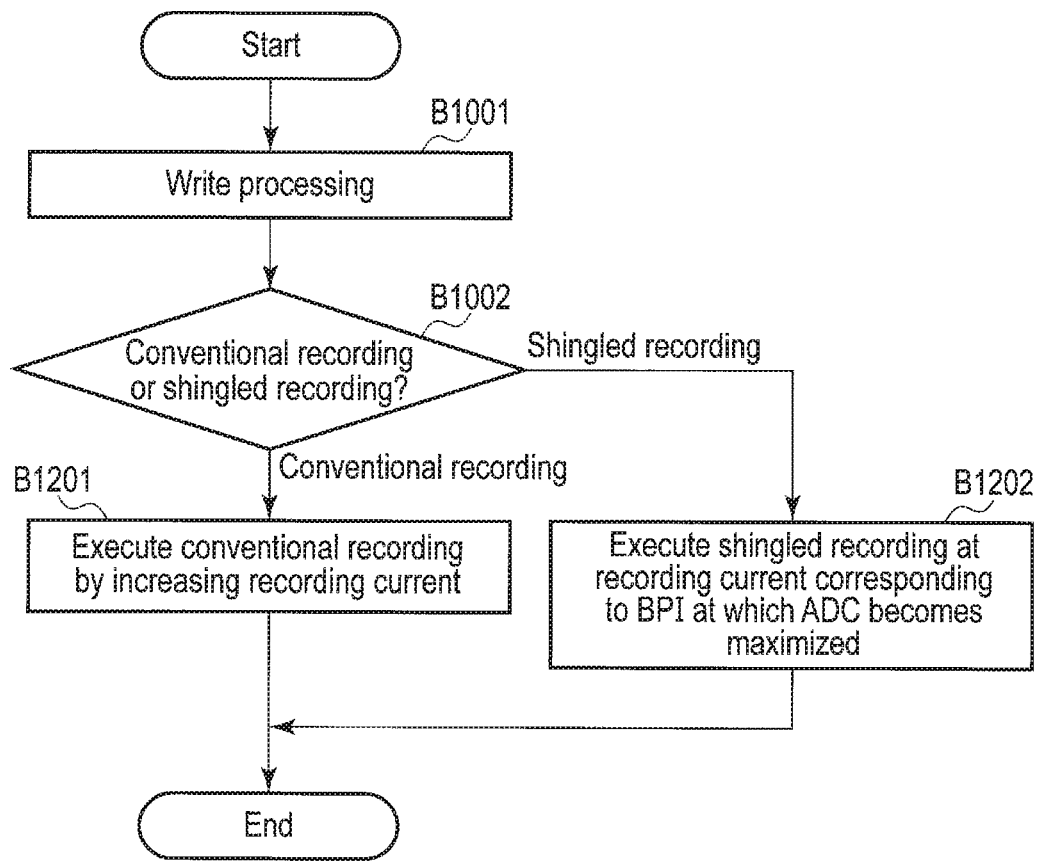
F I G. 12

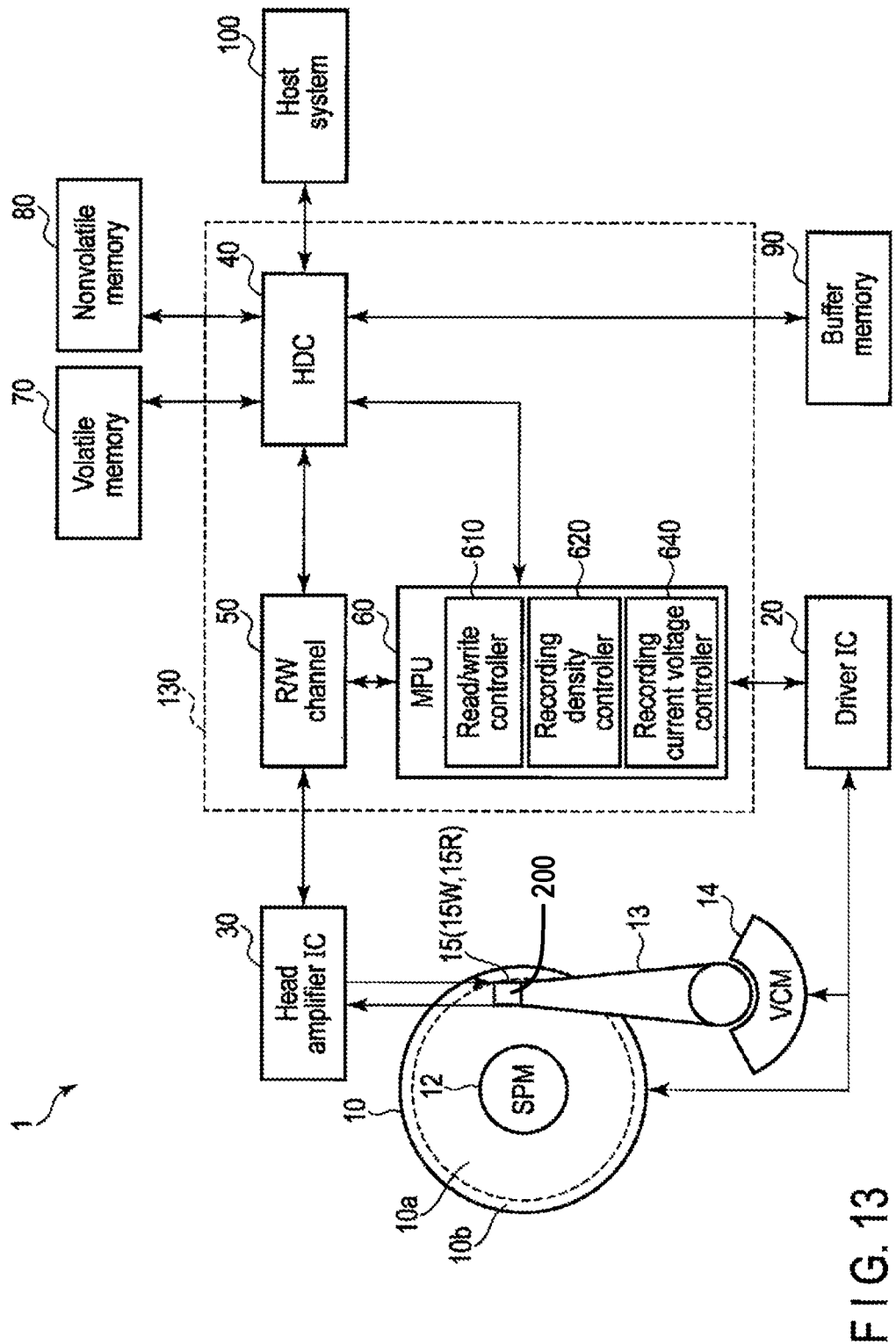
F I G. 13

US 10,957,343 B1

DISK DEVICE HAVING CONVENTIONAL MAGNETIC RECORDING REGION AND SHINGLED MAGNETIC RECORDING REGION OF DIFFERENT LINEAR DENSITY

CROSS-REFERENCE TO RELATED APPLICATIONS

This application is based upon and claims the benefit of priority from Japanese Patent Application No. 2019-154813, filed Aug. 27, 2019, the entire contents of which are incorporated herein by reference.

FIELD

Embodiments described herein relate generally to a magnetic disk device and a write processing method.

BACKGROUND

Recently, magnetic disk devices using technologies which realize high recording density have been developed. As the magnetic disk device which realizes high recording density, there is a magnetic disk device using shingled recording (shingled write magnetic recording: SMR or singled write recording: SWR) which writes a plurality of tracks on top of one another in a radial direction of a disk. There is also a magnetic disk device which can select and execute one of conventional recording, which writes a plurality of tracks with a space in between in a radial direction of a disk, and shingled recording.

BRIEF DESCRIPTION OF THE DRAWINGS

FIG. 1 is a block diagram showing the configuration of a magnetic disk device according to the first embodiment.

FIG. 3 is a schematic diagram showing an example of conventional recording processing.

FIG. 5 is a diagram showing an example of a change of TPI with respect to BPI of each particular radial region.

FIG. 6 is a diagram showing an example of a change of ADC with respect to BPI of each particular radial region.

FIG. 10 is a flowchart showing an example of write processing according to the first embodiment.

FIG. 11 is a block diagram showing the configuration of a magnetic disk device according to a modification example 1.

FIG. 12 is a flowchart showing an example of write processing according to the modification example 1.

FIG. 13 is a block diagram showing the configuration of a magnetic disk device according to a modification example 2.

DETAILED DESCRIPTION

Figure 2:
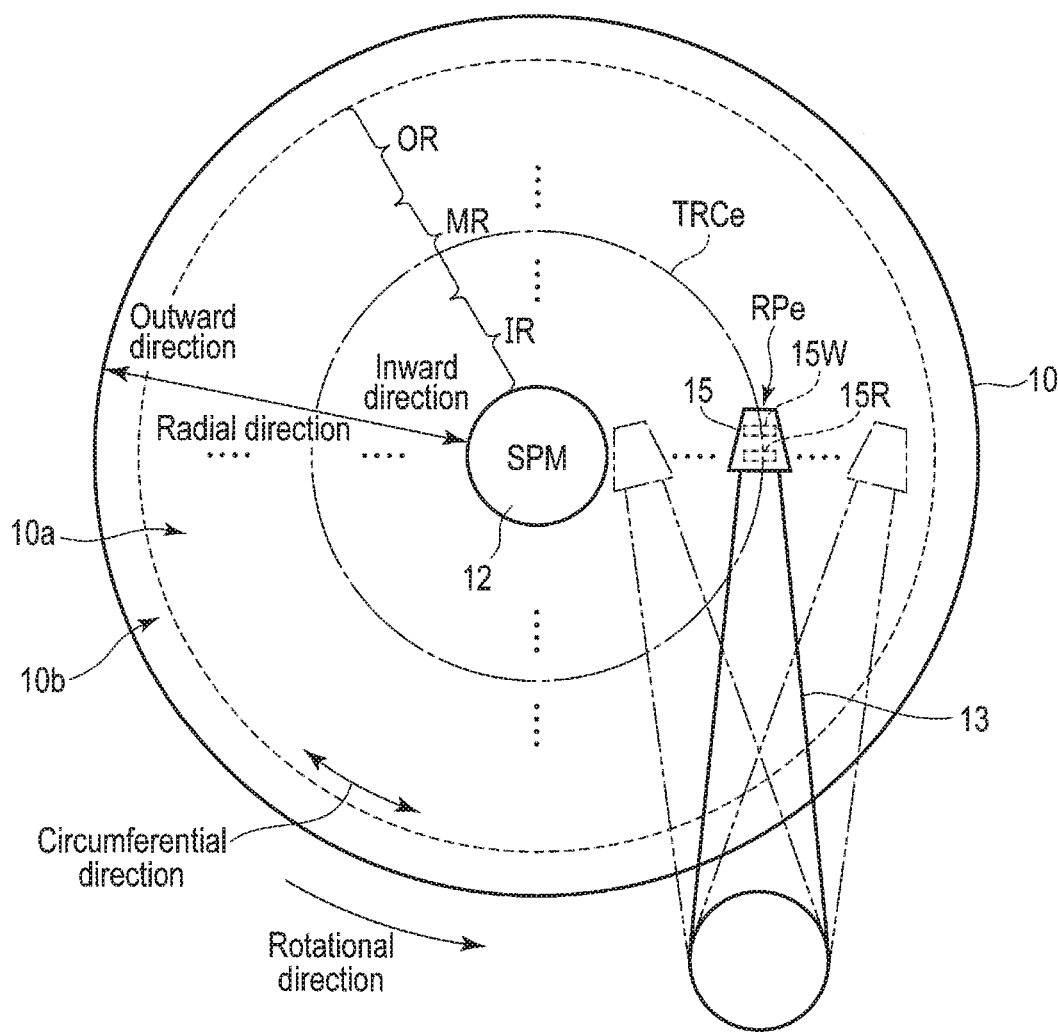
FIG. 2 is a schematic diagram showing an example of arrangement of a head with respect to a disk according to the first embodiment.

In general, according to one embodiment, a magnetic disk device comprises a disk; a head which writes data to the disk and reads data from the disk; and a controller which executes, in a first region segmented in a radial direction of the disk, at least one of conventional recording processing which writes a plurality of tracks with a space in between in the radial direction at a first linear recording density and shingled recording processing which writes a plurality of tracks on top of one another in the radial direction at a second linear recording density which is less than or equal to the first linear recording density.

An embodiment will be described with reference to the accompanying drawings. Note that the drawings are presented by way of example only and are not intended to limit the scope of the invention.

First Embodiment

FIG. 1 is a diagram showing the configuration of a magnetic disk device 1 according to the first embodiment.

The magnetic disk device 1 includes a head/disk assembly (HDA) which will be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is a single-chip integrated circuit. In addition, the magnetic disk device 1 is connected to a host system (hereinafter referred to simply as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is mounted in the SPM 12 and is rotated by the drive of the SPM 12. The arm 13 and the VCM 14 constitute an actuator. The actuator controls movement of the head 15 mounted on the arm 13 to a particular position of the disk 10 by the drive of the VCM 14. Two or more disks 10 and two or more heads 15 may be provided.

The disk 10 includes, in a region to which data can be written, a user data region 10a which can be accessed from a user and a system area 10b to which information necessary for system management is written. A direction orthogonal to a radial direction of the disk 10 is referred to as a circumferential direction. The circumferential direction corresponds to a direction parallel to the circumference of disk 10. With regard to the radial direction, a direction toward the outer circumference of the disk 10 will be referred to as an outward direction (outside) and the opposite direction from the outward direction will be referred to as an inward direction (inside). In addition, a particular position in the radial direction of the disk 10 may be referred to as a radial position, and a particular position in the circumferential direction of the disk 10 may be referred to as a circumferential position. A radial position and a circumferential position may be referred to collectively and simply as a position. On the disk 10, a plurality of tracks may be written in the radial direction. The disk 10 is segmented into a plurality of regions (hereinafter referred to also as zones) for each particular range in the radial direction. A zone includes a plurality of tracks. A track includes a plurality of sectors. A region segmented in the radial direction of the disk 10 may be referred to also as a radial region. A radial region includes, for example, a zone, a track, a sector, and the like. Note that the "track" is used as one region of a plurality of regions segmented in the radial direction of the disk 10, data extending in the circumferential direction of the disk 10 or data written to a track, or may be used in various other senses. The "sector" is used as one region of a plurality of regions segmented in the circumferential direction of a track, data written to a particular position of the disk 10 or data written to a sector, or may be used in various other senses. In some cases, "a track written to the disk 10" may be referred to as "a write track" and "a track read from the disk 10" may be referred to as "a read track". In other cases, "a write track" may be referred to simply as "a track", "a read track" may be referred to simply as "a track", or "a write track" and "a read track" may be referred to collectively as "a track". "A width in the radial direction of a track" may be referred to as "a track width". "A width in the radial direction of a write track" may be referred to as "a write track width" and "a width in the radial direction of a read track" may be referred to as "a read track width". "A write track width and a read track width" may be referred to collectively as "a track width". "A path through a central position of a track width of a track" will be referred to as "a track center". "A path through a central position of a write track width of a write track" may be referred to as "a write track center" and "a path through a central position of a read track width of a read track" may be referred to as "a read track center". "A write track center and a read track center" may be referred to collectively and simply as "a track center".

The head 15 includes a slider as a main body, and a write head 15W and a read head 15R which are mounted on the slider. The write head 15W writes data to the disk 10. The read head 15R reads data which is written to the disk 10. Note that "a write head 15W" may be referred to simply as "a head 15", "a read head 15R" may be referred to simply as "a head 15" or "a write head 15W and a read head 15R" may be referred to collectively as "a head 15". "A central portion of a head 15" may be referred to as "a head 15", "a central portion of a write head 15" may be referred to as "a write head 15W" or "a central portion of a read head 15R" may be referred to as "a read head 15R". "A central portion of a write head 15W" may be referred to simply as "a head 15" and "a central portion of a read head 15R" may be referred to simply as "a head 15". "To position a central portion of the head 15 on a track center of a particular track" may be expressed as "to position the head 15 on a particular track", "to arrange the head 15 on a particular track", "to locate the head 15 on a particular track" or the like.

FIG. 2 is a schematic diagram showing an example of arrangement of the head 15 with respect to the disk 10 according to the present embodiment. As shown in FIG. 2, with regard to the circumferential direction, a direction in which the disk 10 rotates will be referred to as a rotational direction. Note that the rotational direction is indicated as a counterclockwise direction in the example shown in FIG. 2 but may be an opposite direction (clockwise direction). In FIG. 2, the user data region 10a is segmented into an inner circumferential region IR located in the inward direction, an outer circumferential region OR located in the outward direction, and a middle circumferential region MR located between the inner circumferential region IR and the outer circumferential region OR. FIG. 2 shows a radial position RPe. The radial position RPe is included in the middle circumferential region MR. Note that the radial position RPe may be included in the inner circumferential region IR or may be included in the outer circumferential region OR. FIG. 2 shows a track center TRCe. For example, the track center TRCe is concentrically located with respect to the disk 10. For example, the track center TRCe is in the form of a perfect circle. Note that the track center TRCe may not be in the form of a circle but may be in the form of a wave extending in the circumferential direction while oscillating in the radial direction. In FIG. 2, the radial position RPe corresponds to the track center TRCe.

In the example shown in FIG. 2, the head 15 is positioned in the radial position RPe, and writes data to a particular track along the track center TRCe or reads data which is written to a particular track along the track center TRCe.

The driver IC 20 controls the drive of the SPM 12 and the drive of the VCM 14 according to the control of the system controller 130 (more specifically, an MPU 60 which will be described later).

The head amplifier IC (preamplifier) 30 includes a read amplifier, a write driver, and the like. The read amplifier amplifies a read signal which is read from the disk 10, and outputs it to the system controller 130 (more specifically, a read/write (R/W) channel 50 which will be described later). The write driver outputs, to the head 15, a write current corresponding to a signal which is output from the R/W channel 50.

The volatile memory 70 is a semiconductor memory which loses stored data when supply of power is cut off. The volatile memory 70 stores data, etc., necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory which maintains stored data even if supply of power is cut off. The nonvolatile memory 80 is, for example, a NOR or NAND flash read only memory (ROM) (FROM).

The buffer memory 90 is a semiconductor memory which temporarily stores data, etc., transmitted and received between the magnetic disk device 1 and the host 100. Note that the buffer memory 90 may be integrally formed with the volatile memory 70. The buffer memory 90 is, for example, a DRAM, a static random access memory (SRAM), an SDRAM, a ferroelectric random access memory (FeRAM), a magnetoresistive random access memory, or the like.

The system controller (controller) 130 is realized using, for example, a large-scale integrated circuit (LSI) called a system-on-a-chip (SoC) on which a plurality of elements are integrated on a single chip. The system controller 130 includes a hard disk controller (HDC) 40, a read/write (R/W) channel 50, and a microprocessor (MPU) 60. The HDC 40, the R/W channel 50 and the MPU 60 are electrically connected to one another. The system controller 130 is electrically connected to, for example, the driver IC 20, the head amplifier IC 60, the volatile memory 70, the nonvolatile memory 80, the buffer memory 90, the host system 100, and the like.

The HDC 40 controls data transfer between the host 100 and the R/W channel 50 according to an instruction from the MPU 60 which will be described later. The HDC 40 is electrically connected to, for example, the volatile memory 70, the nonvolatile memory 80, the buffer memory 90, and the like.

The R/W channel 50 executes signal processing of read data and write data according to an instruction from the MPU 60. The R/W channel 50 has a circuit or function for modulating write data. The R/W channel 50 also has a circuit or function for measuring the signal quality of read data. The R/W channel 50 is electrically connected to, for example, the head amplifier IC 30 and the like.

The MPU 60 is a main controller which controls each unit of the magnetic disk device 1. The MPU 60 controls the VCM 14 via the driver IC 20, and executes positioning of the head 15. The MPU 60 controls an operation of writing data to the disk 10, and also selects a storage destination of write data transferred from the host 100. In addition, the MPU 60 controls an operation of reading data from the disk 10, and also controls processing of read data transferred from the disk 10 to the host 100. The MPU 60 is connected to each unit of the magnetic disk device 1. For example, the MPU 60 is electrically connected to the driver IC 20, the HDC 40, the R/W channel 50, and the like.

The MPU 60 includes a read/write controller 610 and a recording density controller 620. The MPU 60 executes processing of each unit, for example, each of the read/write controller 610, the recording density controller 620 and the like on firmware. Note that the MPU 60 may include each unit, for example, each of the read/write controller 610, the recording density controller 620, and the like as a circuit.

The read/write controller 610 controls read processing and write processing of data according to a command, etc., from the host 100. The read/write controller 610 controls the VCM 14 via the driver IC 20, positions the head 15 in a particular radial position on the disk 10, and executes read processing and write processing.

For example, the read/write controller 610 executes write processing in a conventional recording (conventional magnetic recording (CMR)) mode of writing data to another track which is adjacent in the radial direction of a particular track (hereinafter referred to also as an adjacent track) with a particular space (gap) in the radial direction from the particular track. Here, "adjacent" certainly means a case where items of data, objects, regions, spaces or the like are in contact with one another but also includes a case where data items, objects, regions, spaces or the like are spaced apart from one another with a particular space in between. "An adjacent track" includes "a track which is adjacent in the outward direction of a particular track", "a track which is adjacent in the inward direction of a particular track" and "a plurality of tracks which are adjacent in the outward direction and the inward direction of a particular track". In the following, "to write data in a conventional magnetic recording mode" may be referred to also as "to execute conventional recording", "to execute conventional recording processing" or may be referred to simply "to write". In addition, the read/write controller 610 executes write processing in a shingled recording (shingled write magnetic recording (SMR) or shingled write recording (SWR)) mode of writing a track which is to be subsequently written (hereinafter referred to as a subsequent track) on a part in the radial direction of a particular track (hereinafter referred to as a previous track). In the following, "to write data in a shingled recording mode" may be referred to also as "to execute shingled recording" or "to execute shingled recording processing". The read/write controller 610 executes conventional recording processing or shingled recording processing according to a command, etc., from the host 100. In other words, the read/write controller 610 selectively executes conventional recording processing and shingled recording processing according to a command, etc., from the host 100. Note that the read/write controller 610 may be configured to execute conventional recording processing only or may be configured to execute shingled recording processing only.

FIG. 3 is a schematic diagram showing an example of conventional recording processing. FIG. 3 shows tracks TR1, TR2 and TR3. FIG. 3 shows a track center TRC1 of the track TR1, a track center TRC2 of the track TR2 and a track center TRC3 of the track TR3. In the conventional recording, a track pitch TRP1 of the tracks TR1 and TR2 corresponds to a distance between the track centers TRC1 and TRC2, and a track pitch TRP2 of the tracks TR2 and TR3 corresponds to a distance between the track centers TRC2 and TRC3. The track TR1 and the track TR2 are spaced apart from each other by a gap GP1. The track TR2 and the track TR3 are spaced apart from each other by a gap GP2. In FIG. 3, for the sake of convenience of explanation, each track is illustrated as a straight strip having a particular track width and extending in the circumferential direction. However, in practice, each track is curved parallel to the circumferential direction. In addition, each track may be in the form of a wave extending in the circumferential direction while oscillating in the radial direction.

In the example shown in FIG. 3, in a particular region of the disk 10, for example, in the user data region 10*a*, the read/write controller 610 positions the head 15 at the track center TRC1, and executes conventional recording of the track TR1 or a particular sector of the track TR1. In the user data region 10*a*, the read/write controller 610 positions the head 15 at the track center TRC2, which is spaced apart in the outward direction from the track center TRC1 of the track TR1 by the track pitch TRP1, and executes conventional recording of the track TR2 or a particular sector of the track TR2. In the user data region 10*a*, the read/write controller 610 positions the head 15 at the track center TRC3, which is spaced apart in the outward direction from the track center TRC2 of the track TR2 by the track pitch TRP2, and executes conventional recording of the track TR3 or a particular sector of the track TR3. In a particular region of the disk 10, for example, in the user data region 10*a*, the read/write controller 610 may sequentially execute conventional recording on the tracks TR1, TR2 and TR3 or may randomly execute conventional recording on a particular sector of the track TR1, a particular sector of the track TR2 and a particular sector of the track TR3.

Figure 4:
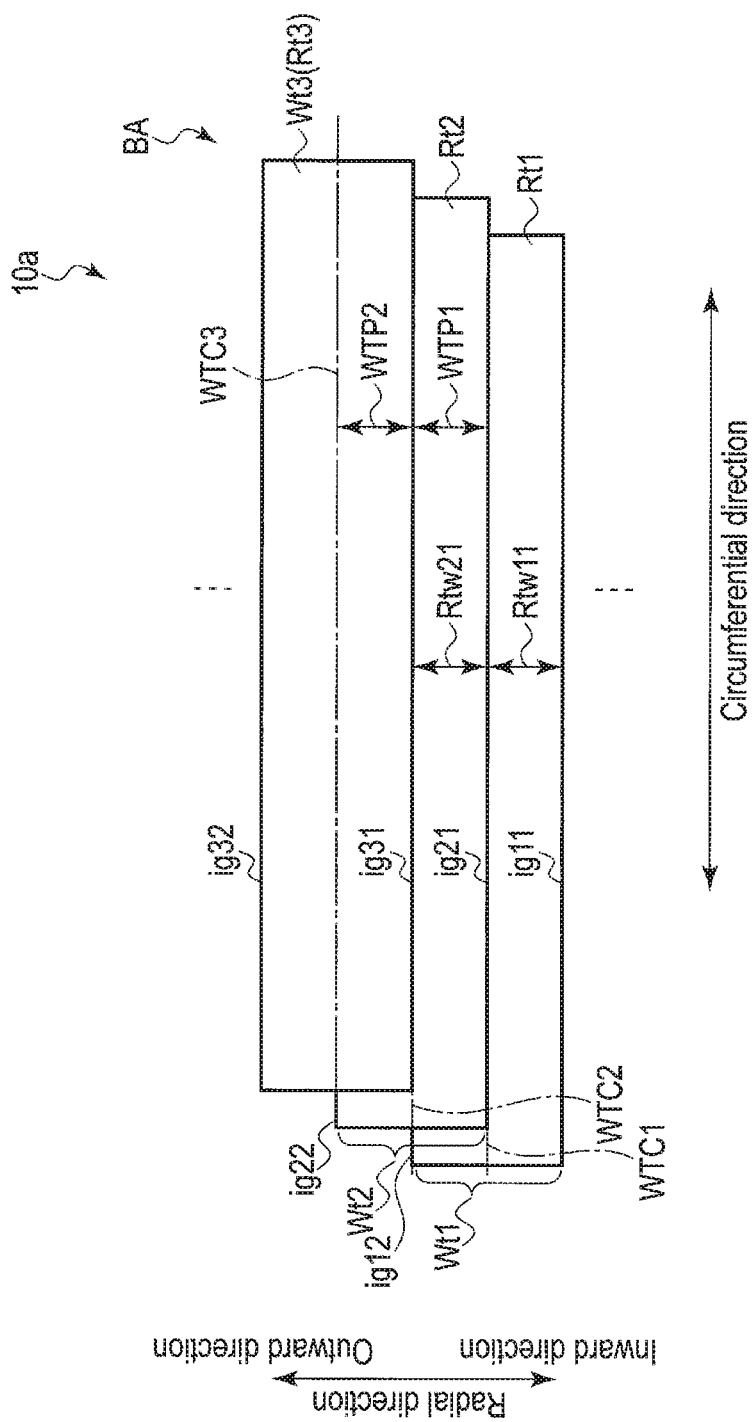
FIG. 4 is a schematic diagram showing an example of shingled recording processing.

FIG. 4 is a schematic diagram showing an example of shingled recording processing. FIG. 4 shows a band region BA including a plurality of tracks (track group or band) which are successively written on top of one another in one direction in the radial direction. In the shingled recording, a written track is referred to as a write track, and on a particular write track, a remaining region except a region on which a subsequent write track is written is referred to as a read track. In FIG. 4, for the sake of convenience of explanation, each track is illustrated as a straight strip having a particular track width and extending in the circumferential direction. However, in practice, each track is curved parallel to the circumferential direction. In addition, each track may be in the form of a wave extending in the circumferential direction while oscillating in the radial direction.

FIG. 4 shows write tracks Wt1, Wt2 and Wt3. The write track Wt1 has a track edge ig11 and a track edge ig12. In the example illustrated, the track edge ig11 is an edge in the inward direction of the write track Wt1 and the track edge ig12 is an edge in the outward direction of the write track Wt1. A write track center WTC1 corresponds to a center between the track edges ig11 and ig12. The write track Wt2 has a track edge ig21 and a track edge ig22. In the example illustrated, the track edge ig21 is an edge in the inward direction of the write track Wt2 and the track edge ig22 is an edge in the outward direction of the write track Wt2. A write track center WTC2 corresponds to a center between the track edges ig21 and ig22. A write track pitch WTP1 corresponds to a distance in the radial direction between the write track centers WTC1 and WTC2. A write track Wt3 has a track edge ig31 and a track edge ig32. In the example illustrated, the track edge ig31 is an edge in the inward direction of the write track Wt3 and the track edge ig32 is an edge in the outward direction of the write track Wt3. A write track center WTC3 corresponds to a center between the track edges ig31 and ig32. A write track pitch WTP2 corresponds to a distance in the radial direction between the write track centers WTC2 and WTC3.

FIG. 4 shows a read track width Rtw11 which is a width in the radial direction from the track edge ig11 to the track edge ig21, and a read track width Rtw21 which is a width in the radial direction from the track edge ig21 to the track edge ig31. In the shingled recording, the read track width Rtw11 corresponds to the track pitch of a read track Rt1 and a read track Rt2, and the read track width Rtw21 corresponds to the track pitch of the read track Rt2 and a read track Rt3. In addition, the read track width Rtw11 corresponds to the track pitch WTP1, and the read track width Rtw21 corresponds to the track pitch WTP2. In the following, the read track width Rtw11 may be referred to also as a track pitch Rtw11, and the read track width Rtw21 may be referred to also as a track pitch Rtw21. Although the band region BA includes three tracks in FIG. 4, the band region BA may include less than three tracks or more than three tracks.

In the example shown in FIG. 4, in a particular region of the disk 10, for example, in the band region BA of the user data region 10a, the read/write controller 610 writes the write track Wt1, writes the write track Wt2 with the track pitch Rtw11 (the write track pitch WTP1) on the write track Wt1 in the outward direction of the write track Wt1, and writes the write track Wt3 with the track pitch Rtw21 (the write track pitch WTP2) on the write track Wt2 in the outward direction of the write track Wt2. In a particular region of the disk 10, for example, in the band region BA of the user data region 10a, the read/write controller 610 sequentially executes shingled recording on the tracks Wt1, Wt2 and Wt3. In the case of writing a band region different from the band region BA in the radial direction of the band region BA, the read/write controller 610 writes the band region with a particular gap in the radial direction from the band region BA.

The recording density controller 620 controls the recording density of data to be written to the disk 10. For example, the recording density controller 620 controls tracks per inch (TPI) and bits per inch (BPI) at the time of writing data to the disk 10. For example, the recording density controller 620 controls BPI based on a recording current applied to the head 15 via the head amplifier IC 30, on-track error rate, or the like. The recording density controller 620 controls TPI and BPI and writes data to a particular radial region of the disk 10 via the units of the magnetic disk device 1, for example, the read/write controller 610, the driver IC 20, the head amplifier IC 30, the HDC 40, the R/W channel 50, and the like. TPI indicates the number of tracks per inch in the radial direction (track density or recording density in the radial direction). BPI indicates the number of bits per inch in the circumferential direction (linear recording density or recording density in the circumferential direction). In the following, "TPI", "track density" and "recording density in the radial direction" may be referred to simply as "recording density", "BPI", "linear recording density" and "recording density in the circumferential direction" may be referred to simply as "recording density", "TPI and BPI" may be referred to collectively as "recording density", and "areal density capability (ADC) corresponding to a product of TPI and BPI" which will be described later may be referred to as "recording density". In addition, "recording density" may also be used in various other senses.

The recording density controller 620 controls recording density, for example, BPI and TPI according to a recording mode (conventional recording and shingled recording). For example, according to the influence of leakage of magnetic flux (adjacent track interference: ATI), etc., from the head 15 at the time writing an adjacent track, the recording density controller 620 controls the recording density, for example, the BPI and TPI of data, a track, etc., to be recorded in the conventional recording mode on a particular radial region. In other words, according to the influence of ATI, etc., from the head 15 at the time of writing an adjacent track, the recording density controller 620 controls BPI and TPI and executes conventional recording of data, a track, etc., on a particular radial region. In the singled recording, according to the influence of ATI, etc., from the head 15 at the time of writing a subsequent track on a previous track, the recording density controller 620 controls the recording density, for example, the BPI and TPI of data, a track, etc., to be recorded in the shingled recording mode. In other words, according to the influence of ATI, etc., from the head 15 at the time of writing a subsequent track on a previous track, the recording density controller 620 controls BPI and TPI and executes shingled recording of data, a track, etc., on a particular radial region.

FIG. 5 is a diagram showing an example of a change of TPI with respect to BPI of each particular radial region. FIG. 5 shows each maximum TPI at which data readable at each BPI can be written in each radial region (hereinafter referred to also as maximum TPI). In other words, FIG. 5 shows the dependence of each maximum TPI on each BPI of each particular radial region. In the following "maximum TPI" may be referred to simply as "TPI". In FIG. 5, the vertical axis indicates TPI, and the horizontal axis indicates BPI. On the vertical axis of FIG. 5, TPI increases in the direction of the pointing end of an arrow indicating large, and decreases in the direction of the pointing end of an arrow indicating small. On the horizontal axis of FIG. 5, BPI increases in the direction of the pointing end of an arrow indicating large, and decreases in the direction of the pointing end of an arrow indicating small. The horizontal axis of FIG. 5 is segmented into a radial region OZR corresponding to a zone ZnO of the outer circumferential region OR, a radial region MZR corresponding to a zone ZnM of the middle circumferential region MR, and a radial region IZR corresponding to a zone ZnI of the inner circumferential region IR. In the radial region OZR of FIG. 5, a group of changes of the maximum TPI with respect to BPI in the case of executing shingled recording on the radial region OZR using different heads 15 (hereinafter referred to as a change group OST of the maximum TPI), and a change group OCT of the maximum TPI with respect to BPI in the case of executing conventional recording on the radial region OZR using different heads 15 are illustrated. In the radial region MZR of FIG. 5, a change group MST of the maximum TPI with respect to BPI in the case of executing shingled recording on the radial region MZR using different heads 15, and a change group MCT of the maximum TPI with respect to BPI in the case of executing conventional recording on the radial region MZR using different heads 15 are illustrated. In the radial region IZR of FIG. 5, a change group IST of the maximum TPI with respect to BPI in the case of executing shingled recording on the radial region IZR using different heads 15, and a change group ICT of the maximum TPI with respect to BPI in the case of executing conventional recording on the radial region IZR using different heads 15 are illustrated.

In the example shown in FIG. 5, in the changeable (controllable) range of BPI at a time when data is written to data to the radial region OZR, the change group OST of the maximum TPI is greater than the change group OCT of the maximum TPI. The change group OCT of the maximum TPI decreases as BPI increases. Here, "the changeable (controllable) range of BPI" corresponds to the range of BPI which satisfies a standard of a particular error rate, for example, a bit error rate (BER). In addition, the change group OST of the maximum TPI decreases as BPI increases. The change rate of the change group OST of the maximum TPI to the change of BPI is higher than the change rate of the change group OCT of the maximum TPI to the change of BPI. Therefore, the change group OST of the maximum TPI is larger than the change group OCT of the maximum TPI in a case where BPI is small, but is close to the change group OCT of the maximum TPI in a case where BPI is large.

In the example shown in FIG. 5, in the changeable range of BPI at a time when data is written to the radial region MZR, the change group MST of the maximum TPI is larger than the change group MCT of the maximum TPI. The change group MCT of the maximum TPI decreases as BPI increases. In addition, the change group MST of the maximum TPI decreases as BPI increases. The change rate of the change group MST of the maximum TPI to the change of BPI is higher than the change rate of the change group MCT of the maximum TPI to the change of BPI. Therefore, the change group MST of the maximum TPI is larger than the change group MCT of the maximum TPI in a case where BPI is small, but is close to the change group MCT of the maximum TPI in a case where BPI is large.

In the example shown in FIG. 5, in the changeable range of BPI at a time when data is written to the radial region IZR, the change group IST of the maximum TPI is larger than the change group ICT of the maximum TPI. The change group ICT of the maximum TPI decreases as BPI increases. In addition, the change group IST of the maximum TPI decreases as BPI increases. The change rate of the change group IST of the maximum TPI to the change of BPI is higher than the change rate of the change group ICT of the maximum TPI to the change of BPI. Therefore, the change group IST of the maximum TPI is larger than the change group ICT of the maximum TPI in a case where BPI is small, but is close to the change group ICT of the maximum TPI in a case where BPI is large.

FIG. 6 is a diagram showing an example of a change of ADC with respect to BPI of each particular radial region. FIG. 6 corresponds to, for example, FIG. 5. In FIG. 6, the vertical axis indicates recording density, for example, ADC corresponding to a product of BPI and TPI, and the horizontal axis indicates BPI. For example, the BPI of the horizontal axis of FIG. 6 corresponds to the BPI of the horizontal axis of FIG. 5, and the ADC of the vertical axis of FIG. 6 corresponds to a product of the BPI of FIG. 5 and the maximum TPI corresponding to the BPI of FIG. 5. On the vertical axis of FIG. 6, ADC increases in the direction of the pointing end of an arrow indicating large, and decreases in the direction of the pointing end of an arrow indicating small. On the horizontal axis of FIG. 6, BPI increases in the direction of the pointing end of an arrow indicating large, and decreases in the direction of the pointing end of an arrow indicating small. The horizontal axis of FIG. 6 is segmented into a radial region OZR corresponding to a zone ZnO of the outer circumferential region OR, a radial region MZR corresponding to a zone ZnM of the middle circumferential region MR, and a radial region IZR corresponding to a zone ZnI of the inner circumferential region IR. BPI OBV1 and BPI OBV2 are indicated on the horizontal axis of the radial area OZR of FIG. 6. BPI OBV2 is larger than BPI OBV1. For example, BPI OBV2 corresponds to a maximum value within the changeable range of BPI at a time when data is written to the radial region OZR. BPI MBV1 and BPI MBV2 are indicated on the horizontal axis of the radial region MZR of FIG. 6. BPI MBV2 is larger than BPI MBV1. For example, BPI MBV2 corresponds to a maximum value within the changeable range of BPI at a time when data is written to the radial region MZR. BPI IBV1 and BPI IBV2 are indicated on the horizontal axis of the radial region IZR of FIG. 6. BPI IBV2 is larger than BPI IBV1. For example, BPI IBV2 corresponds to a maximum value within the changeable range of BPI at a time when data is written to the radial region IZR. In the radial region OZR of FIG. 6, a group of changes OSA of ADC with respect to BPI in the case of executing shingled recording on the radial region OZR using different heads 15 (hereinafter referred to as a change group OSA of the ADC), and a change group OCA of ADC with respect to BPI in the case of executing conventional recording on the radial region OZR using different heads 15 are illustrated. In the change group OSA of ADC of FIG. 6, an ADC group OSP1 corresponding to BPI OBV1 and an ADC group OSP2 corresponding to BPI OBV2 are illustrated. In the change group OSA of the ADC of FIG. 6, the ADC group OSP1 corresponds to a local maximum value. In the change group OCA of ADC of FIG. 6, an ADC group OCP1 corresponding to BPI OBV1 and an ADC group OCP2 corresponding to BPI OBV2 are illustrated. In the change group OCA of ADC of FIG. 6, the ADC group OCP2 corresponds to a maximum value. In the radial region MZR of FIG. 6, a change group MSA of ADC with respect to BPI in the case of executing shingled recording on the radial region MZR using different heads 15, and a change group MCA of ADC with respect to BPI in the case of executing conventional recording on the radial region MZR using different heads 15 are illustrated. In the change group MSA of ADC of FIG. 6, an ADC group MSP1 corresponding to BPI MBV1 and an ADC group MSP2 corresponding to BPI MBV2 are illustrated. In the change group MSA of ADC of FIG. 6, the ADC group MSP1 corresponds to a local maximum value. In the change group MCA of ADC of FIG. 6, an ADC group MCP1 corresponding to BPI MBV1 and an ADC group MCP2 corresponding to BPI MBV2 are illustrated. In the change group MCA of ADC of FIG. 6, the ADC group MCP2 corresponds to a maximum value. In the radial region IZR of FIG. 6, a change group ISA of ADC with respect to BPI in the case of executing shingled recording on the radial region IZR using different heads 15, and a change group ICA of ADC with respect to BPI in the case of executing conventional recording on the radial region IZR using different heads 15 are illustrated. In the change group ISA of ADC of FIG. 6, an ADC group ISP1 corresponding to BPI IBV1 and an ADC group ISP2 corresponding to BPI IBV2 are illustrated. In the change group ISA of ADC of FIG. 6, the ADC group ISP1 corresponds to a local maximum value. In the change group ICA of ADC of FIG. 6, an ADC group ICP1 corresponding to BPI IBV1 and an ADC group ICP2 corresponding to BPI IBV2 are illustrated. In the change group ICA of ADC of FIG. 6, the ADC group ICP2 corresponds to a maximum value.

In the example shown in FIG. 6, in the changeable range of BPI at a time when data is written to the radial region OZR, the change group OSA of ADC is larger than the change group OCA of ADC. The change group OCA of ADC increases as BPI increases. The change group OCA of ADC is the maximum value OCP2 at the maximum value OBV2 in the changeable range of BPI. The change group OCA of the ADC tends to be saturated at the maximum value OBV2 in the changeable range of BPI. The change group OSA of ADC increases as BPI increases to BPI OBV1, and the change group OSA of ADC decreases as BPI increases from BPI OBV1 to BPI OBV2. The change group OSA of ADC is the local maximum value OSP1 at BPI OBV1. The ADC group OSP1 is larger than the ADC group OCP1. The ADC group OSP2 and the ADC group OCP2 are close to each other.

For example, the recording density controller 620 sets BPI to the maximum value OBV2, sets TPI to the maximum TPI corresponding to the maximum value OBV2, and executes conventional recording on the radial region OZR. In other words, the recording density controller 620 executes conventional recording of data on the radial region OZR at the maximum value OBV2 within the changeable range of BPI and at the maximum TPI corresponding to the maximum value OBV2. The recording density controller 620 sets BPI to BPI OBV1 and sets TPI to TPI at which the product of BPI OBV1 and TPI becomes the local maximum value OSP1 of the change group OSA of ADC, and executes shingled recording of data on the radial region OZR. In other words, the recording density controller 620 executes shingled recording of data on the radial region OZR at BPI OBV1 and at TPI at which the product of BPI OBV1 and TPI becomes the local maximum value OSP1. That is, the recording density controller 620 executes shingled recording of data on the radial region OZR at BPI which is less than or equal to the maximum value OBV2 within the changeable range of BPI and at TPI corresponding to BPI which is less than or equal to the maximum value OBV2. Note that the recording density controller 620 may execute conventional recording of data on the radial region OZR at the maximum value OBV2 within the changeable range of BPI and at the maximum TPI corresponding to the maximum value OBV2, and may execute shingled recording of data on the radial region OZR at BPI which is less than or equal to the maximum value OBV2 within the changeable range of BPI and at TPI corresponding to BPI which is less than or equal to the maximum value OBV2. Alternatively, the recording density controller 620 may execute conventional recording of data on the radial region OZR at BPI which is close to the maximum value OBV2 within the changeable range of BPI and at the maximum TPI corresponding to BPI which is close to the maximum value OBV2.

In the example shown in FIG. 6, in the changeable range of BPI at a time when data is written to the radial region MZR, the change group MSA of ADC is larger than the change group MCA of ADC. The change group MCA of ADC increases as BPI increases. The change group MCA of ADC is the maximum value MCP2 at the maximum value MBV2 in the changeable range of BPI. The change group MCA of ADC tends to be saturated at the maximum value MBV2 in the changeable range of BPI. The change group MSA of ADC increases as BPI increases to BPI MBV1, and the change group MSA of ADC decreases as BPI increases from BPI MBV1 to BPI MBV2. The change group MSA of ADC is the local maximum value MSP1 at BPI MBV1. The ADC group MSP1 is larger than the ADC group MCP1. The ADC group MSP2 and the ADC group MCP2 become close to each other.

For example, the recording density controller 620 sets BPI to the maximum value MBV2, sets TPI to the maximum TPI corresponding to the maximum value MBV2, and executes conventional recording of data on the radial region MZR. In other words, the recording density controller 620 executes conventional recording of data on the radial region MZR at the maximum value MBV2 in the changeable range of BPI and at the maximum TPI corresponding to the maximum value MBV2. The recording density controller 620 sets BPI to BPI MBV1, sets TPI to TPI at which the product of BPI MBV1 and TPI becomes the local maximum value MSP1 of the change group MSA of ADC, and executes shingled recording of data on the radial region MZR. In other words, the recording density controller 620 executes shingled recording of data on the radial region MZR at BPI MBV1 and at TPI at which the product of BPI MBV1 and TPI becomes the local maximum value MSP1. That is, the recording density controller 620 executes shingled recording of data on the radial region MZR at BPI which is less than or equal to the maximum value MBV2 in the changeable range of BPI and at TPI corresponding to BPI which is less than or equal to the maximum value MBV2. Note that the recording density controller 620 may execute conventional recording of data on the radial region MZR at the maximum value MBV2 in the changeable range of BPI and at the maximum TPI corresponding to the maximum value MBV2, and may execute shingled recording of data on the radial region MZR at BPI which is less than or equal to the maximum value MBV2 in the changeable range of BPI and at TPI corresponding to BPI which is less than or equal to the maximum value MBV2. Alternatively, the recording density controller 620 may execute conventional recording of data on the radial region MZR at BPI which is close to the maximum value MBV2 within the changeable range of BPI and at the maximum TPI corresponding to BPI which is close to the maximum value MBV2.

In the example shown in FIG. 6, in the changeable range of BPI at a time when data is written to the radial region IZR, the change group ISA of ADC is larger than the change group ICA of ADC. The change group ICA of ADC increases as BPI increases. The change group ICA of ADC is the maximum value ICP2 at the maximum value IBV2 in the changeable range of BPI. The change group ICA of ADC tends to be saturated at the maximum value IBV2 in the changeable range of BPI. The change group ISA of ADC increases as BPI increases to BPI IBV1, and the change group ISA of ADC decreases as BPI increases from BPI IBV1 to BPI IBV2. The change group ISA of ADC is the local maximum value ISP1 at BPI IBV1. The ADC group ISP1 is larger than the ADC group ICP1. The ADC group ISP2 and the ADC group ICP2 become close to each other.

For example, the recording density controller 620 sets BPI to the maximum value IBV2, sets TPI to the maximum TPI corresponding to the maximum value IBV2, and executes conventional recording of data on the radial region IZR. In other words, the recording density controller 620 executes conventional recording of data on the radial region IZR at the maximum value IBV2 in the changeable range of BPI and at the maximum TPI corresponding to the maximum value IBV2. The recording density controller 620 sets BPI to BPI IBV1, sets TPI to TPI at which the product of BPI IBV1 and TPI becomes the local maximum value ISP1 of the change group ISA of ADC, and executes shingled recording of data on the radial region IZR. In other words, the recording density controller 620 executes shingled recording of data on the radial region IZR at BPI MBV1 and at TPI at which the product of BPI IBV1 and TPI becomes the local maximum value ISP1. That is, the recording density controller 620 executes shingled recording of data on the radial region IZR at BPI which is less than or equal to the maximum value IBV2 in the changeable range of BPI and TPI corresponding to BPI which is less than or equal to the maximum value IBV2. Note that the recording density controller 620 may execute conventional recording of data on the radial region IZR at the maximum value IBV2 within the changeable range of BPI and at the maximum TPI corresponding to the maximum value IBV2, and may execute shingled recording of data on the radial region IZR at BPI which is less than or equal to the maximum value IBV2 in the changeable range of BPI and at TPI corresponding to BPI which is less than or equal to the maximum value IBV2. Alternatively, the recording density controller 620 may execute conventional recording of data on the radial region IZR at BPI which is close to the maximum value IBV2 within the changeable range of BPI and at the maximum TPI corresponding to BPI which is close to the maximum value IBV2.

In the example shown in FIG. 6, in the case of executing conventional recording on a particular radial region within the changeable range of BPI, ADC increases as BPI increases within the range of BPI. Therefore, in the conventional recording, due to the influence of ATI, etc., from the head 15 at the time of writing a plurality of adjacent tracks in the outward direction and the inward direction, it is considered that, instead of increasing TPI and reducing the track pitch, it is possible to increase BPI and increase the recording density (ADC).

In the example shown in FIG. 6, in the case of executing shingled recording on a particular radial region within the changeable range of BPI, ADC increases in a range where BPI is small within the range of BPI, and ADC decreases in a range where BPI is large within the range of BPI. Therefore, in the shingled recording, due to the influence of ATI, etc., from the head 15 at the time of writing the subsequent track on the previous track, it is considered that it is possible to reduce BPI as much as possible and improve the recording quality of the previous track, it is possible to increase TPI as much as possible and reduce the track pitch, and consequently it is possible to increase the recording density (ADC).

Figure 7:
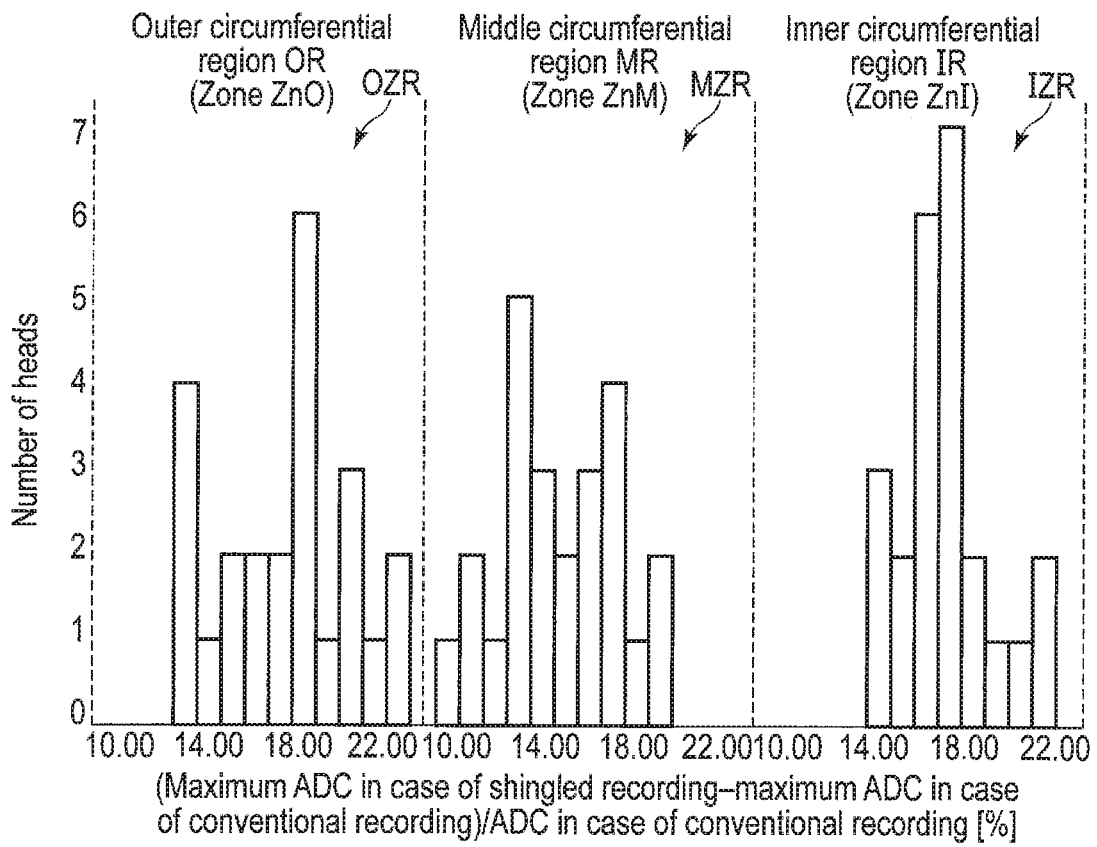
FIG. 7 is a diagram showing an example of the relationship of the number of heads subjected to ADC measurement to the ratio of a maximum ADC in the case of conventional recording to the difference value between a maximum ADC in the case of shingled recording and the maximum ADC in the case of conventional recording.

FIG. 7 is a diagram showing an example of the relationship of the number of heads subjected to ADC measurement to the ratio of the maximum ADC in the case of executing conventional recording to the difference value between the maximum ADC in the case of executing shingled recording and the maximum ADC in the case of executing conventional recording. FIG. 7 corresponds to, for example, FIG. 6. In FIG. 7, the vertical axis indicates the number of heads subjected to ADC measurement. In FIG. 7, the horizontal axis indicates (the maximum ADC in the case of executing shingled recording-the maximum ADC in the case of executing conventional recording)/the maximum ADC in the case of executing conventional recording (hereinafter referred to also as the ratio of the maximum ADC in the case of executing conventional recording to the maximum ADC in the case of executing shingled recording). The horizontal axis of FIG. 7 is segmented into the radial region OZR corresponding to the zone ZnO of the outer circumferential region OR, the radial region MZR corresponding to the zone ZnM of the middle circumferential region MR, and the radial region IZR corresponding to the zone ZnI of the inner circumferential region IR.

In the example shown in FIG. 7, the ratio of the maximum ADC in the case of executing conventional recording to the maximum ADC in the case of executing shingled recording is 13% to 23% in the radial region OZR. According to FIGS. 6 and 7, the ADC group OSP1 is, for example, larger than the ADC group OCP2 by 13% to 23%. That is, the ADC group OSP1 in the case of executing shingled recording at BPI OBV1 and at the maximum TPI corresponding to BPI OBV1 on the radial region OZR is larger than the ADC group OCP2 in the case of executing conventional recording at the maximum value OBV2 and at the maximum TPI corresponding to the maximum value OBV2 in the radial region OZR by 13% to 23%. In other words, the ADC group OCP2 in the case of executing conventional recording at the maximum value OBV2 and at the maximum TPI corresponding to the maximum value OBV2 on the radial region OZR is smaller than the ADC group OSP1 in the case of executing shingled recording at BPI OBV1 and at the maximum TPI corresponding to BPI OBV1 in the radial region OZR by 13% to 23%.

In the example shown in FIG. 7, the ratio of the maximum ADC in the case of executing conventional recording to the maximum ADC in the case of executing shingled recording is 10% to 20% in the radial region MZR. According to FIGS. 6 and 7, the ADC group MSP1 is, for example larger than the ADC group MCP2 by 10% to 20%. That is, the ADC group MSP1 in the case of executing shingled recording at BPI MBV1 and at the maximum TPI corresponding to BPI MBV1 on the radial region MZR is larger than the ADC group MCP2 in the case of executing conventional recording at the maximum value MBV2 and at the maximum TPI corresponding to the maximum value MBV2 in the radial region MZR by 10% to 20%. In other words, the ADC group MCP2 in the case of executing conventional recording at the maximum value MBV2 and at the maximum TPI corresponding to the maximum value MBV2 on the radial region MZR is smaller than the ADC group MSP1 in the case of executing shingled recording at BPI MBV1 and at the maximum TPI corresponding to BPI MBV1 on the radial region MZR by 10% to 20%.

In the example shown in FIG. 7, the ratio of the maximum ADC in the case of executing conventional recording to the maximum ADC in the case of executing shingled recording is 14% to 22% in the radial region IZR. According to FIGS. 6 and 7, the ADC group ISP1 is, for example, larger than the ADC group ICP2 by 14% to 22%. That is, the ADC group ISP1 in the case of executing shingled recording at BPI IBV1 and at the maximum TPI corresponding to BPI IBV1 on the radial region IZR is larger than the ADC group ICP2 in the case of executing conventional recording at the maximum value IBV2 and at the maximum TPI corresponding to the maximum value IBV2 on the radial region IZR by 14% to 22%. In other words, the ADC group ICP2 in the case of executing conventional recording at the maximum value IBV2 and at the maximum TPI corresponding to the maximum value IBV2 on the radial region IZR is smaller than the ADC group ISP1 in the case of executing shingled recording at BPI IBV1 and at the maximum TPI corresponding to BPI IBV1 on the radial region IZR by 14% to 22%.

Figure 8:
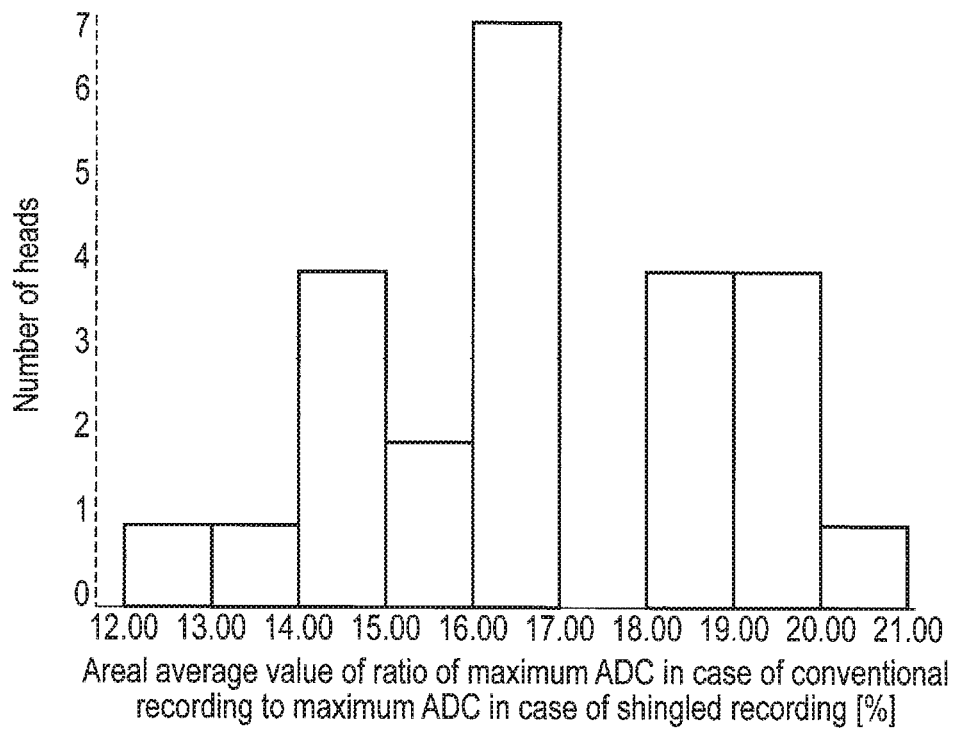
FIG. 8 is a diagram showing an example of the relationship of the number of heads subjected to ADC measurement to the areal average value of the ratio of a maximum ADC in the case of conventional recording to a maximum ADC in the case of shingled recording.

FIG. 8 is a diagram showing an example of the relationship of the number of heads subjected to ADC measurement to the areal average value of the ratio of the maximum ADC in the case of executing conventional recording to the maximum ADC in the case of executing shingled recording.

FIG. 8 corresponds to, for example, FIGS. 6 and 7. In FIG. 8, the vertical axis indicates the number of heads subjected to ADC measurement. In FIG. 8, the horizontal axis indicates the areal average value of the ratio of the maximum ADC in the case of executing conventional recording to the maximum ADC in the case of executing shingled recording.

In the example shown in FIG. 8, the areal average value of the maximum ADC in the case of executing shingled recording is larger than the areal average value of the maximum ADC in the case of executing conventional recording by 12% to 21%. In other words, the areal average value of the maximum ADC in the case of executing conventional recording is smaller than the areal average value of the maximum ADC in the case of executing shingled recording by 12% to 21%.

Figure 9:
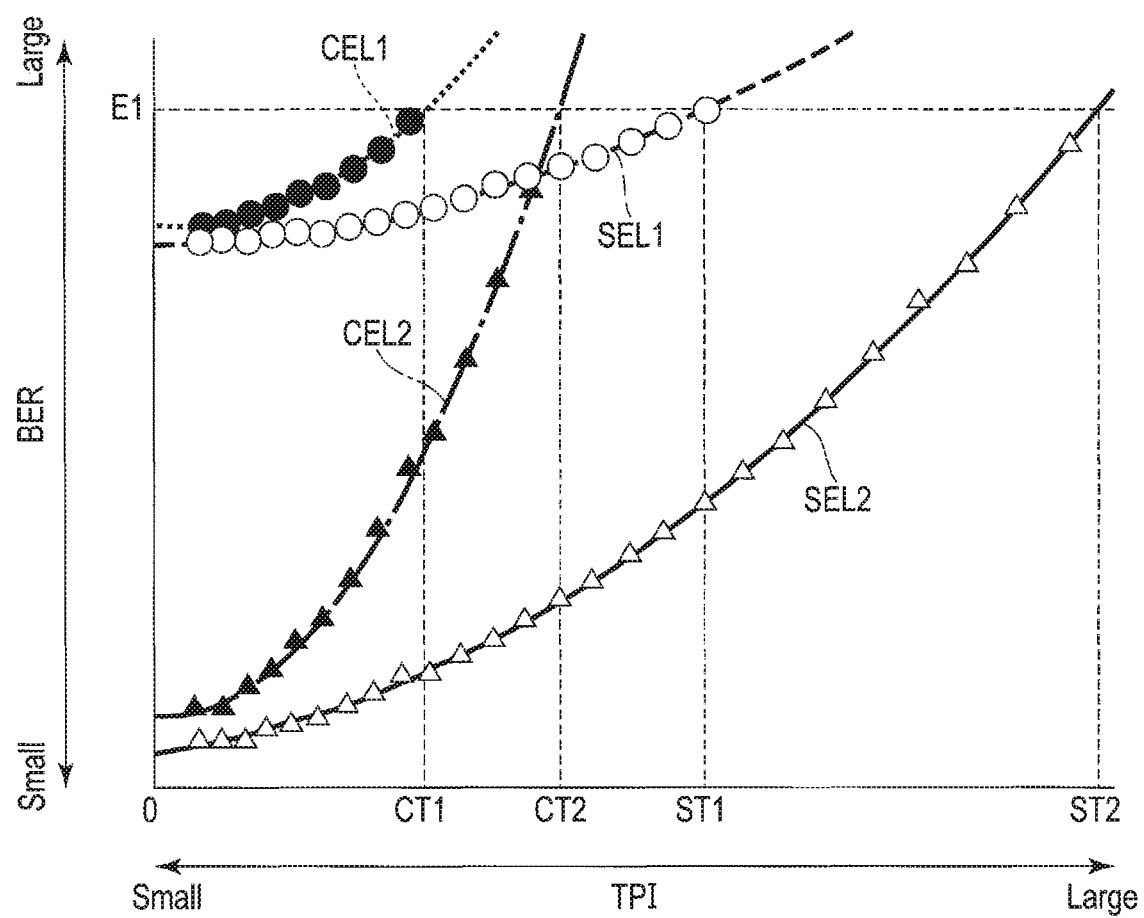
FIG. 9 is a diagram showing an example of a change of BER with respect to TPI in a particular radial region.

FIG. 9 is a diagram showing an example of a change of BER with respect to TPI in a particular radial region. FIG. 9 shows a change of BER with respect to TPI in the case of executing conventional recording at particular BPI on a particular radial region (hereinafter referred to also as a change CEL1 of BER), a change SEL1 of BER with respect to TPI in the case of executing shingled recording at particular BPI on a particular radial region, a change CEL2 of BER with respect to TPI in the case of executing conventional recording at BPI which is less than or equal to the BPI of the change CEL1 of BPI on a particular radial region, and a change SEL2 of BER with respect to TPI in the case of executing shingled recording at BPI which is less than or equal to the BPI of the change SEL1 of BPI on a particular radial region. With regard to the changes CEL1, SEL1, CEL2 and SEL2 of BER, circular points and triangular points indicate measured measurement values. For example, the BPI of the change CEL1 of BER and the BPI of the change SEL1 of BER are the same. Here, "the same", "equal", "match", "substantially the same" and the like certainly mean that these are completely the same but also include a case where these are different from each other but can be assumed to be substantially the same. In addition, for example, the BPI of the change CEL2 of BER and the BPI of the change SEL2 of BER are the same. In FIG. 9, the vertical axis indicates an error rate, for example, BER and the horizontal axis indicates TPI. On the vertical axis of FIG. 9, BER increases in the direction of the pointing end of an arrow indicating large and decreases in the direction of the pointing end of an arrow indicating small. The vertical axis of FIG. 9 indicates BER E1. BER E1 corresponds to, for example, the upper limit of BER which does not cause a read error. On the horizontal axis of FIG. 9, TPI increases in the direction of the pointing end of an arrow indicating large, and decreases in the direction of the pointing end of an arrow indicating small. TPI CT1, TPI CT2, TPI ST1, and TPI ST2 are indicated on the horizontal axis of FIG. 9. TPI CT2 is larger than CPI CT1, TPI ST1 is larger than TPI CT2, and TPI ST2 is larger than TPI ST1. TPI CT1 corresponds to, for example, the maximum TPI corresponding to BER E1 in the change CEL1 of BER, and TPI CT2 corresponds to, for example, the maximum TPI corresponding to BER E1 in the change CEL2 of BER. TPI ST1 corresponds to, for example, the maximum TPI corresponding to BER E1 in the change SEL1 of BER, and TPI ST2 corresponds to, for example, the maximum TPI corresponding to BER E1 in the change SEL2 of BER.

In the example shown in FIG. 9, TPI CT2 corresponding to BER E1 in the change CEL2 of BER is larger than TPI CT1 corresponding to BER E1 in the change CEL1 of BER. In the case of executing conventional recording on a particular region, TPI increases as BPI decreases, and TPI decreases as BPI increases. If these two are compared with each other in terms of ADC which is the product of BPI and TPI, ADC increases as BPI increases. For this reason, the larger BPI is generally selected in the conventional recording mode.

In the example shown in FIG. 9, TPI ST2 corresponding to BER E1 in the change SEL2 of BER is larger than TPI ST1 corresponding to BER E1 in the change SEL1 of BER. In the example shown in FIG. 9, TPI ST2 is about two times larger than TPI ST1. In the case of executing shingled recording on a particular region, TPI increases as BPI decreases, and TPI decreases as BPI increases. If these two are compared with each other in terms of ADC which is the product of BPI and TPI, unlike the conventional recording mode, ADC increases as BPI decreases. For this reason, the smaller BPI is generally selected in the shingled recording mode.

FIG. 10 is a flowchart showing an example of write processing according to the present embodiment.

The MPU 60 starts the write processing of a particular radial region (B1001), and determines whether the recording mode is conventional recording or shingled recording (B1002). If the recording mode is determined to be conventional recording (conventional recording of B1002), the MPU 60 increases BPI and executes conventional recording of data on a particular radial region (B1003), and ends the processing. For example, the MPU 60 executes conventional recording of data on a particular radial region at the maximum value of BPI within the changeable range of BPI and at TPI (maximum TPI) corresponding to the maximum value of BPI. Note that the MPU 60 may execute conventional recording of data on a particular radial region at BPI which is close to the maximum value of BPI within the changeable range of BPI and at TPI (maximum TPI) corresponding to the BPI which is close to the maximum value of BPI. If the recording mode is determined to be shingled recording (shingled recording of B1002), the MPU 60 executes shingled recording of data on a particular radial region at BPI and TPI at which ADC becomes maximized (B1004) and ends the processing. For example, the MPU 60 executes shingled recording of data on a particular radial region at BPI which is less than or equal to the maximum value of BPI within the changeable BPI and at TPI (maximum TPI) in which the product (ADC) of BPI which is less than or equal to the maximum value of BPI and TPI becomes maximized.

According to the present embodiment, the magnetic disk device 1 increases BPI and executes conventional recording of data on a particular radial region. For example, the magnetic disk device 1 executes conventional recording of data on a particular radial region at the maximum value of BPI within the changeable range of BPI and at TPI (maximum TPI) corresponding to the maximum value of BPI. In addition, the magnetic disk device 1 executes shingled recording of data on a particular radial region at BPI and TPI at which ADC becomes maximized. For example, the magnetic disk device 1 executes shingled recording of data on a particular radial region at BPI which is less than or equal to the maximum value of BPI within the changeable range of BPI and at TPI (maximum TPI) at which the product (ADC) of BPI which is less than or equal to the maximum value and TPI becomes maximized.

Therefore, the magnetic disk device can improve recording density. Although the magnetic disk device 1 of the first embodiment has been described as a magnetic disk device which can selectively execute conventional recording and shingled recording, the magnetic disk device 1 of the first embodiment may be a conventional recording type magnetic disk device which only executes conventional recording or may be a shingled recording type magnetic disk device which only executes shingled recording.

Next, magnetic disk devices according to modification examples of the first embodiment will be described. In the modification examples, the same portions as those of the first embodiment will be denoted by the same reference numbers, and detailed descriptions thereof will be omitted.

Modification Example 1

A magnetic disk device 1 of a modification example 1 differs from the aforementioned magnetic disk device 1 of the first embodiment in that the magnetic disk device 1 of the modification example 1 controls the recording current and thereby controls BPI.

FIG. 11 is a block diagram showing the configuration of the magnetic disk device 1 according to the modification example 1.

The head 15 includes a recording coil, a main magnetic pole, a write shield facing the main magnetic pole, and the like. When a current (hereinafter referred to as a recording current) is supplied to the recording coil, a recording magnetic field is excited in the main magnetic pole and the write shield. Therefore, the main magnetic pole and the write shield are magnetized. By magnetic flux flowing through these magnetized main magnetic pole and write shield, the magnetization direction of a recording bit of the disk 10 is changed, and a magnetization pattern according to the recording current is recoded on the disk 10.

The head amplifier IC 30 supplies the recording current to the recording coil according to the control of the MPU 60, for example.

The MPU 60 further includes a recording current controller 630. The MPU 60 executes processing of each unit, for example, each of the read/write controller 610, the recording density controller 620, the recording current controller 630, and the like on firmware. Note that the MPU 60 may include each unit, for example, each of the read/write controller 610, the recording density controller 620, the recording density controller 630, and the like as a circuit.

The recording current controller 630 controls the recording current. The recording current controller 630 controls the recording current via the head amplifier IC 30 based on the recording density controlled by the recording density controller 620, for example, BPI. For example, based on BPI controlled by the recording density controller 620, the recording current controller 630 increases the recording current in the case of increasing BPI and reduces the recording current in the case of reducing BPI.

FIG. 12 is a flowchart showing an example of write processing according to the modification example 1.

The MPU 60 starts the write processing of a particular radial region (B1001), and determines whether the recording mode is conventional recording or shingled recording (B1002). If the recording mode is determined to be conventional recording (conventional recording of B1002), the MPU 60 increases the recording current for the purpose of increasing BPI and executes conventional recording of data on a particular radial region (B1201), and ends the processing. For example, the MPU 60 executes conventional recording of data on a particular radial region at a recording current corresponding to the maximum value of BPI within the changeable range of BPI and at TPI (maximum TPI) corresponding to the maximum value of BPI. Note that the MPU 60 may execute conventional recording of data on a particular radial region at a recording current corresponding to BPI which is close to the maximum value of BPI within the changeable range of BPI and at TPI (maximum TPI) corresponding to BPI which is close to the maximum value of BPI. If the recording mode is determined to be shingled recording (shingled recording of B1002), the MPU 60 executes shingled recording of data on a particular radial region at a recording current corresponding to BPI at which ADC becomes maximized and at TPI corresponding to BPI at which ADC becomes maximized (B1202) and ends the processing. For example, the MPU 60 executes shingled recording of data on a particular radial region at a recording current corresponding to BPI which is less than or equal to the maximum value of BPI within the changeable range of BPI and at TPI (maximum TPI) at which the product (ADC) of the recording current corresponding to BPI which is less than or equal to the maximum of the BPI and TPI becomes maximized.

According to the modification example 1, the magnetic disk device 1 increases the recording current for the purpose of increasing BPI, and executes conventional recording of data on a particular radial region. In addition, the magnetic disk device 1 executes shingled recording of data on a particular radial region at a recording current corresponding to BPI at which ADC becomes maximized and at TPI corresponding to BPI at which ADC becomes maximized. Therefore, the magnetic disk device 1 can improve recording density.

Modification Example 2

A magnetic disk device 1 of a modification example 2 differs from the aforementioned magnetic disk devices 1 of the first embodiment and the modification example 1 in that the magnetic disk device 1 of the modification example 2 has an assist function.

FIG. 13 is a block diagram showing the configuration of the magnetic disk device 1 according to the modification example 2.

The magnetic disk device 1 according to the modification example 2 is, for example, a high-frequency assisted recording type magnetic disk device or a thermally assisted magnetic recording (TAMR) type magnetic disk device.

The head 15 has an assist element 200. If the magnetic disk device 1 is a high-frequency assisted recording type magnetic disk device, the assist element 200 has, for example, a spin torque oscillator (STO) which applies a high-frequency magnetic field (microwave). In addition, if the magnetic disk device 1 is a thermally assisted magnetic recording type magnetic disk device, the assist element 200 has, for example, a light generating element (for example, a laser diode), a near-field light emitting element (plasmon generator, near-field transducer) which emits near-field light to the disk 10, and a waveguide which propagates the light generated from the light generating element to the near-field light emitting element.

The head amplifier IC 30 supplies current and voltage to the assist element 200 according to the control of the MPU 60, for example.

The MPU 60 further includes a current/voltage controller 640. The MPU 60 executes processing of each unit, for example, each of the read/write controller 610, the recording density controller 620, the current/voltage controller 640, and the like on firmware. Note that the MPU 60 may include each unit, for example, each of the read/write controller 610, the recording density controller 620, the current/voltage controller 640, and the like as a circuit.

The current/voltage controller 640 controls current and voltage applied to the assist element 200. The current/voltage controller 640 controls current (voltage) applied to the assist element 200 via the head amplifier IC 30 based on the recording density controlled by the recording density controller 620, for example, BPI. For example, based on BPI controlled by the recording density controller 620, the current/voltage controller 640 increases current (voltage) applied to the assist element 200 in the case of increasing BPI and reduces current (or voltage) applied to the assist element 200 in the case of reducing BPI.

Figure 14:
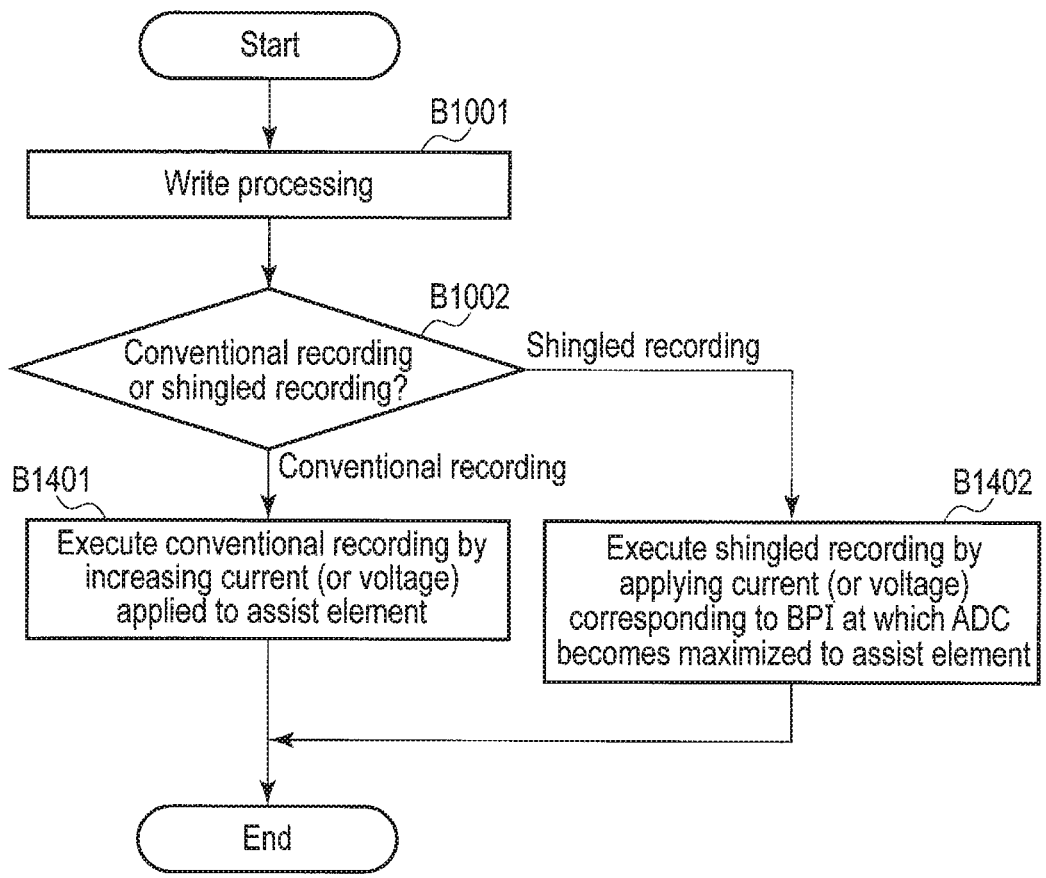
FIG. 14 is a flowchart showing an example of write processing according to the modification example 2.

FIG. 14 is a flowchart showing an example of write processing according to the modification example 2.

The MPU 60 starts the write processing of a particular radial region (B1001), and determines whether the recording mode is conventional recording or shingled recording (B1002). If the recording mode is determined to be conventional recording (conventional recording of B1002), the MPU 60 increases current (or voltage) applied to the assist element 200 for the purpose of increasing BPI, and executes conventional recording of data on a particular radial region (B1401), and ends the processing. For example, the MPU 60 executes conventional recording of data on a particular radial region at a current (or voltage) applied to the assist element 200 which corresponds to the maximum value of BPI within the changeable range of BPI and at TPI (maximum TPI) corresponding to the maximum value of BPI. Note that the MPU 60 may execute conventional recording of data on a particular radial region at a current (or voltage) applied to the assist element 200 which corresponds to BPI which is close to the maximum value of BPI within the changeable range of BPI and at TPI (maximum TPI) corresponding to BPI which is close to the maximum value of BPI. If the recording mode is determined to be shingled recording (shingled recording of B1002), the MPU 60 executes shingled recording of data on a particular radial region at a current (or voltage) applied to the assist element 200 which corresponds to BPI at which ADC becomes maximized and at TPI corresponding to BPI at which ADC becomes maximized (B1402) and ends the processing. For example, the MPU 60 executes shingled recording of data on a particular radial region at a current (or voltage) applied to the assist element 200 which corresponds to BPI which is less than or equal to the maximum value of BPI within the changeable range of BPI and at TPI (maximum TPI) at which the product (ADC) of BPI less than or equal to the maximum value of BPI and TPI becomes maximized.

According to the modification example 2, the magnetic disk device 1 increases current (or voltage) applied to the assist element 200 for the purpose of increasing BPI, and executes conventional recording of data on a particular radial region. In addition, the magnetic disk device 1 executes shingled recording of data on a particular radial region at a current (voltage) applied to the assist element 200 which corresponds to BPI at which ADC becomes maximized and at TPI corresponding to BPI at which ADC becomes maximized. Therefore, the magnetic disk device 1 can improve recording density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head which writes data to the disk and reads data from the disk; and
   a controller which executes, in a first region segmented in a radial direction of the disk, at least one of conventional recording processing which writes a plurality of tracks with a space in between in the radial direction at a first linear recording density and shingled recording processing which writes a plurality of tracks on top of one another in the radial direction at a second linear recording density which is less than or equal to the first linear recording density, wherein
   the controller executes the shingled recording processing at the second linear recording density and at a track density at which a product of the second linear recording density and the track density becomes maximized in the first region.

2. The magnetic disk device of claim 1, wherein a first recording density at which a plurality of tracks are written with a space in between in the radial direction at the first linear recording density in the first region is less than a second recording density at which a plurality of tracks are written on top of one another in the radial direction at the second linear recording density in the first region by 10% to 23%.

3. The magnetic disk device of claim 1, wherein the controller executes the conventional recording processing at a first recording current corresponding to the first linear recording density in the first region and executes the shingled recording processing at a second recording current corresponding to the second linear recording density in the first region.

4. The magnetic disk device of claim 1, wherein the first linear recording density corresponds to a maximum value in a changeable range.

5. The magnetic disk device of claim 4, wherein the range corresponds to a range of a linear recording density which satisfies a standard of an error rate.

6. The magnetic disk device of claim 1, wherein
   the head has an assist element, and
   the controller executes the conventional recording processing by applying a first current corresponding to the first linear recording density to the assist element in the first region, and executes the shingled recording processing by applying a second current corresponding to the second linear recording density to the assist element in the first region.

7. A magnetic disk device comprising:
   a disk having, in a first region segmented in a radial direction, a plurality of first tracks which are written with a space in between in the radial direction at a first linear recording density and a plurality of second tracks which are written on top of one another in the radial direction at a second linear recording density less than the first linear recording density;
   a head which writes data to the disk and reads data from the disk; and
   a controller which executes at least one of conventional recording processing which writes a plurality of tracks with a space in between in the radial direction and shingled recording processing which writes a plurality of tracks on top of one another in the radial direction, wherein the controller executes the shingled recording processing at the second linear recording density and at a track density at which a product of the second linear recording density and the track density becomes maximized in the first region.

8. The magnetic disk device of claim 7, wherein a first recording density at which a plurality of tracks are written with a space in between in the radial direction at the first linear recording density in the first region is less than a second recording density at which a plurality of tracks are written on top of one another in the radial direction at the second linear recording density in the first region by 10% to 23%.

9. The magnetic disk device of claim 7, wherein the controller executes the conventional recording processing at a first recording current corresponding to the first linear recording density in the first region, and executes the shingled recording processing at a second recording current corresponding to the second linear recording density in the first region.

10. The magnetic disk device of claim 7, wherein the first linear recording density corresponds to a maximum value in a changeable range.

11. The magnetic disk device of claim 10, wherein the range corresponds to a range of a linear recording density which satisfies a standard of a bit error.

12. The magnetic disk device of claim 7, wherein
the head has an assist element, and
the controller executes the conventional recording processing by applying a first current corresponding to the first linear recording density to the assist element in the first region, and executes the shingled recording processing by applying a second current corresponding to the second linear recording density to the assist element in the first region.

13. A write processing method applied to a magnetic disk device comprising a disk and a head which writes data to the disk and reads data from the disk, the write processing method comprising:

executing, in a first region segmented in a radial direction of the disk, at least one of conventional recording processing which writes a plurality of tracks with a space in between in the radial direction at a first linear recording density and shingled recording processing which writes a plurality of tracks on top of one another in the radial direction at a second linear recording density less than or equal to the first linear recording density; and executing the shingled recording processing at the second linear recording density and at a track density at which a product of the second linear recording density and the track density becomes maximized in the first region.

14. The write processing method of claim 13, wherein a first recording density at which a plurality of tracks are written with a space in between in the radial direction at the first linear recording density in the first region is less than a second recording density at which a plurality of tracks are written on top of one another in the radial direction at the second liner recording density in the first region by 10% to 23%.

15. The write processing method of claim 13, further comprising:

executing the conventional recording processing at a first recording current corresponding to the first linear recording density in the first region; and executing the shingled recording processing at a second recording current corresponding to the second linear recording density in the first region.

16. The write processing method of claim 13, wherein the first linear recording density corresponds to a maximum value in a changeable range.

17. The write processing method of claim 13, further comprising:

executing the conventional recording processing by applying a first current corresponding to the first linear recording density to an assist element provided in the head in the first region; and executing the shingled recording processing by applying a second current corresponding to the second linear recording density to the assist element in the first region.

* * * * *